United States Patent
Delcamp et al.

(10) Patent No.: US 12,173,212 B2
(45) Date of Patent: Dec. 24, 2024

(54) DESIGN, SYNTHESIS, AND PHOTOPHYSICAL PROPERTIES OF A NOVEL NIR II DYE FOR BIOLOGICAL IMAGING AND OPTOELECTRONIC DEVICES

(71) Applicants: University of Mississippi, University, MS (US); Mississippi State University, Starkville, MS (US)

(72) Inventors: Jared Delcamp, Oxford, MS (US); Nathan Hammer, Oxford, MS (US); Colleen Scott, Starkville, MS (US)

(73) Assignees: University of Mississippi, University, MS (US); Mississippi State University, Starkville, MS (US)

( * ) Notice: Subject to any disclaimer, the term of this patent is extended or adjusted under 35 U.S.C. 154(b) by 630 days.

(21) Appl. No.: 17/407,838

(22) Filed: Aug. 20, 2021

(65) Prior Publication Data
US 2022/0056335 A1    Feb. 24, 2022

Related U.S. Application Data

(60) Provisional application No. 63/068,475, filed on Aug. 21, 2020.

(51) Int. Cl.
  *C09K 11/06*  (2006.01)
  *C09B 57/00*  (2006.01)
  *G01N 21/64*  (2006.01)

(52) U.S. Cl.
  CPC .............. *C09K 11/06* (2013.01); *C09B 57/00* (2013.01); *G01N 21/6428* (2013.01); *C09K 2211/1007* (2013.01); *C09K 2211/1018* (2013.01); *G01N 2021/6439* (2013.01)

(58) Field of Classification Search
  CPC ............ C09K 11/06; C09K 2211/1007; C09K 2211/1018; C09B 57/00; G01N 21/6428; G01N 21/6439
  See application file for complete search history.

(56) References Cited

U.S. PATENT DOCUMENTS

2020/0166501 A1*  5/2020  Wang ............... G01N 33/54346

OTHER PUBLICATIONS

Rathnamalala et al., 84(20) J. Org. Chem., 13186-13193 (2019) (Publ'd Sep. 3, 2019) (Year: 2019).*

* cited by examiner

*Primary Examiner* — Timothy R Rozof
(74) *Attorney, Agent, or Firm* — Thomas|Horstemeyer, LLP

(57) ABSTRACT

In one aspect, the disclosure relates to fluorescent dyes that absorb and emit in the near infrared II (NIR II) range of the electromagnetic spectrum, methods of making same, compositions comprising same and methods of using the compositions to perform imaging on biological samples, and optoelectronic devices using the dyes. The dyes are small organic molecules that are inexpensive and facile to produce, can be water-soluble, have tunable properties, and are biocompatible and/or possess low toxicity.

20 Claims, 2 Drawing Sheets

DESIGN, SYNTHESIS, AND PHOTOPHYSICAL PROPERTIES OF A NOVEL NIR II DYE FOR BIOLOGICAL IMAGING AND OPTOELECTRONIC DEVICES

CROSS REFERENCE TO RELATED APPLICATIONS

This application claims the benefit of U.S. Provisional Application No. 63/068,475 filed on Aug. 21, 2020, which is incorporated herein by reference in its entirety.

STATEMENT REGARDING FEDERALLY SPONSORED RESEARCH OR DEVELOPMENT

This invention was made with government support under grant number 1757220, awarded by the National Science Foundation. The government has certain rights in the invention.

FIELD OF INVENTION

This invention relates generally to the field of dye material and, more particularly, to novel emissive dye materials and compositions that absorb and emit light in the NIR II region and methods for synthesizing such materials, including via C—H bond functionalization activation.

BACKGROUND

Photoluminescent materials in the near-infrared I (NIR I) (~0.7 μm-0.9 μm) and near-infrared II (NIR II) (~0.9 μm-1.7 μm) region of the electromagnetic spectrum have applications in many areas such as optical recording, laser filters, thermal writing displays, bioimaging, NIR photography, photodynamic therapy, and solar cells.

Among these applications, NIR I and NIR II materials are desirable for tissue imaging due to the deeper penetration of light, minimal tissue damage, and high spatial resolution as a result of low autofluorescence in the NIR I and NIR II regions. Several examples of known NIR I dyes are derived from common fluorescent dye scaffolds such as cyanine, phthalocyanine and porphyrin, squaraine, BODIPY analogs, benzo[c]heterocycle, and xanthene derivatives.

Among these common scaffolds, xanthene-based dyes are widely explored due to their outstanding photophysical properties and stimuli responses. Consequently, they have been modified to achieve absorption and emission wavelengths in the NIR I region. For example, replacing the bridged oxygen atom of the xanthene scaffold to phosphorus or silicon leads to a reduced optical energy gap into the NIR I region. Several examples of strong atom substitution effects have been demonstrated with various xanthene-based dyes. Other examples of NIR I dyes with moderate to high quantum yields have been produced by extending the π-conjugation of the xanthene scaffold.

In contrast, only a few NIR II fluorophores are currently available. Nanoparticles, nanotubes, and quantum dots have shown interesting photophysical properties as NIR II fluorophores with very high quantum efficiencies; however, these components and fluorophores tend to be insoluble, slow to excrete from the body, and to accumulate in the spleen and liver, making them non-ideal therapeutic agents in many cases. Similarly, polymethine dyes (PDs) are highly toxic.

C—H bond functionalization/activation has emerged as a useful method for the formation of $sp^2$-hybridized C—C bonds. C—H activation synthetic routes have an advantage over the classical cross-coupling approaches in that additional synthetic steps to activate the carbon site and the production of toxic by-products are avoided. C—H functionalization can be highly tolerant of many functional groups, which makes it desirable for the preparation of drugs and natural products. However, since substrates usually contain many C—H bonds, selectivity can be challenging. While C—H functionalization on $sp^2$-hybridized carbon centers has been widely developed for the preparation of conjugated compounds for applications in organic devices, only a few examples have been reported for the synthesis of photoluminescent dyes.

What is needed is a low cost, efficient, tunable material that is based on organic small molecules. The material would be water-soluble and biocompatible and/or possess low toxicity, as well as showing intense absorption and emission in the NIR II region of the electromagnetic spectrum, and would be suitable for multiple applications in various fields, including, but not limited to, biological imaging, NIR photography, photodynamic therapy, solar cells, thermal writing displays, and optoelectronic devices. It would be desirable if the organic small molecules could be produced by a facile method such as selective C—H bond functionalization. Ideally, the method would produce few or no undesired side products. The present disclosure addresses these needs.

SUMMARY

In accordance with the purpose(s) of the present disclosure, as embodied and broadly described herein, the disclosure, in one aspect, relates to fluorescent dyes that absorb and emit in the near infrared II (NIR II) range of the electromagnetic spectrum, methods of making same, compositions comprising same and methods of using the compositions to perform imaging on biological samples, and optoelectronic devices using the dyes. The dyes are small organic molecules that are inexpensive and facile to produce, can be water-soluble, have tunable properties, and are biocompatible and/or possess low toxicity.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 1:
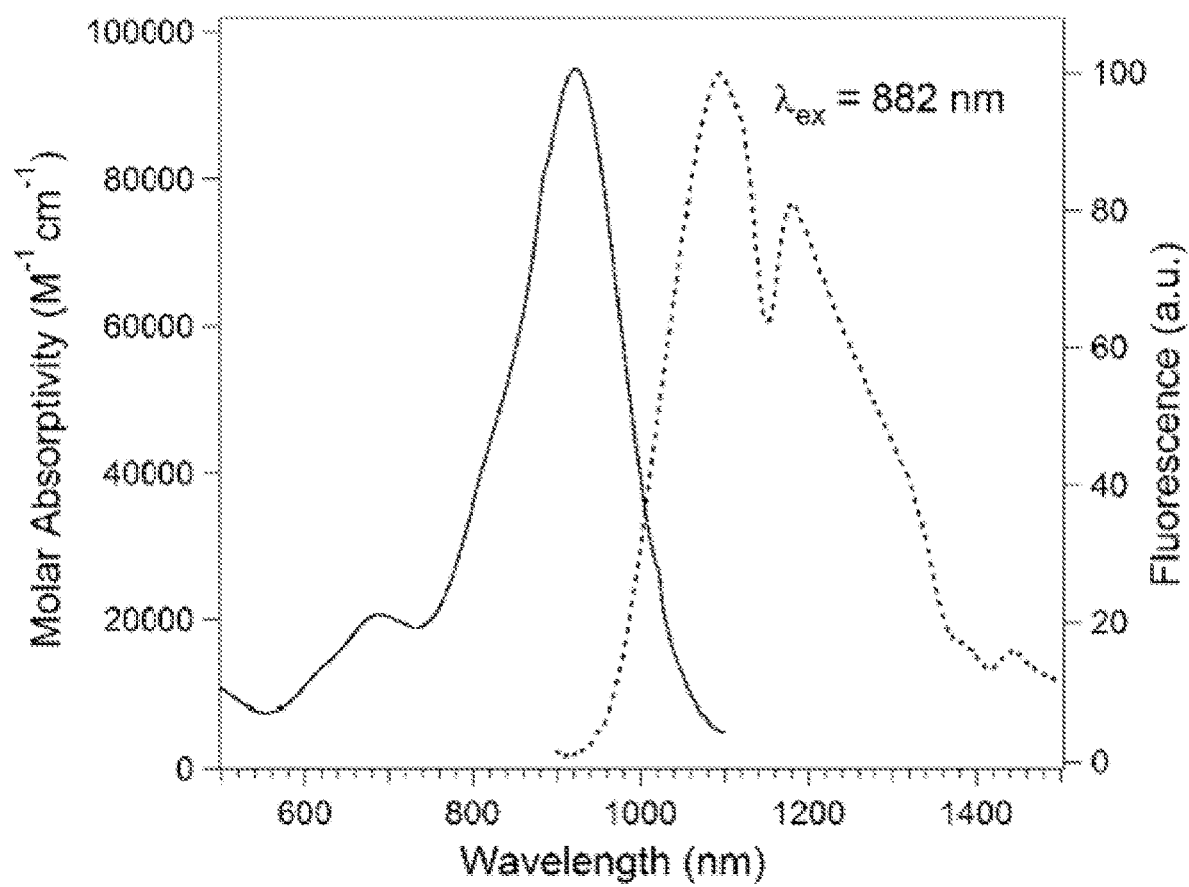
FIG. 1 shows molar absorptivity and emission of RhIndz ethyl ester in dichloromethane. The drop in the emission spectrum at ~1150 nm is a possible spectrometer artifact.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Small molecule organic dyes may attractive for clinical applications because of their tendency to metabolize in the cells and their potential for low toxicity. Disclosed herein is a method for development of NIR II organic emissive dyes by combining donor and acceptor groups. In one aspect, the choice of a good donor—acceptor pair can significantly lower the optical bandgap of a dye due to the promotion of charge transfer events. In a further aspect, indolizines are gaining use in dye-sensitized solar cells as the donor due to a good donor strength compared to ubiquitous triphenylamine donors and other alkyl amine-based donor groups. In an aspect, the excellent donor strength of indolizines is a result of several factors such as, having a nitrogen atom with three separate single bonds with the nitrogen lone pair, low stabilization energy, and a pro-aromatic nature. Disclosed herein are donor-acceptor-donor NIR II fluorescent dyes having the excellent photophysical properties and electron accepting abilities of xanthene-based dyes.

Disclosed herein are compositions including and methods of synthesis for novel NIR II dyes for biological imaging and optoelectronic devices. In one aspect, the present disclosure provides new emissive materials that absorb and emit light in the NIR II region where humans are most transparent. In a further aspect, the compositions allow for direct, real-time laser imaging of biological samples at a faster, more affordable rate than an MRI, while also potentially allowing real time analysis during surgery, as one example. In another aspect, these materials may be able to enhance night vision sensing, broaden solar cell spectral use, and be utilized for secure NIR OLED displays. In still another aspect, these materials and processes are tunable to the SWIR region where telecommunication and night vision options where solutions including organic materials are non-existent. Further in this aspect, use of organic materials in these and similar applications would have a dramatic advantage in operating under ambient conditions relative to current inorganic materials, which often require liquid nitrogen cooling to operate.

In one aspect, in the dyes disclosed herein, the 3-position of the electron rich indolizine is coupled to the 3 and 6 positions of the electron poor xanthene using a C—H bond functionalization reaction.

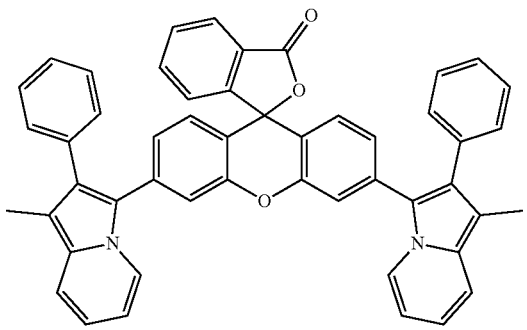

3',6'-bis(1-methyl-2-phenylindolizin-3-yl)-3H-spiro[2-benzofuran-1,9'-xanthen]-3-one (RhIndz)

Disclosed herein is a NIR II xanthene-based dye, as well as a method of preparation of the same using the C—H bond functionalization reaction of 1-methyl-2-phenylindolizine with 3',6'-dibromofluoran (a xanthene derivative). In one aspect, the specific methyl/phenyl substitution pattern on the indolizine was selected to allow for a simple synthesis of an electron rich indolizine with prolonged ambient stability. In a further aspect, the target dye is inspired by rhodamine dyes; however, the xanthene core is attached to carbon atoms of indolizine, instead of the nitrogen atoms common to the rhodamine structure. Interestingly, 3',6'-bis(1-methyl-2-phenylindolizin-3-yl)-3H-spiro[2-benzofuran-1,9'-xanthen]-3-one, which is referred to herein as rhodindolizine (RhIndz), undergoes the typical molecular optical switching between the closed spirocyclic ring structure and the open form that is commonly observed for rhodamine dyes. In still another aspect, RhIndz shows intense absorption and emission in the NIR II region of the spectrum, which is desirable for biological imaging. In a further aspect, to analyze the substituent effects on the C—H activation reaction, substituted indolizines containing both electron withdrawing and electron donating groups on the phenyl ring were investigated.

In an aspect, the NIR II emissive dye disclosed herein is synthesized using a C—H bond functionalization reaction to give a spirolactone product that is non-fluorescent. In a further aspect, upon opening of the lactone ring by the formation of the ethyl ester derivative, the fluorophore absorbs at 920 nm and emits at 1092 nm, which are both in the NIR II region of the electromagnetic spectrum.

In one aspect, the disclosed dyes are water-soluble and use the xanthene core common to rhodamine and derivatives thereof, while also incorporating an indolizine building block that allows for a shifting of the absorption and emission spectra of this molecule into the NIR region. Without wishing to be bound by theory, in another aspect, these new structures delocalize a cation across a planarized pi-system with two nitrogens fully planarized for better delocalization. In a still further aspect, these molecules have allowed emission in a region typically considered inaccessible due to the Energy Gap Law, which suggests emission in this range is not possible due to thermal relaxations. In one aspect, in the disclosed structures, many of the deactivation pathways have been circumvented through planarization to reduce intramolecular collisions.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

The following abbreviations are used herein: near infrared (NIR); 4,4-difluoro-4-bora-3a,4a-diaza-s-indacene (BODIPY); organic light emitting diode (OLED); short-wave infrared (SWIR); dichloromethane (DCM); N-methyl-2-pyrrolidone (NMP); pivalic acid (PivOH); N,N-dimethylacetamide (DMA); tetrahydrofuran (THF), ([1,1'-binaphthalene]-2,2-diyl)bis(diphenylphsophane) (BINAP); dibenzylideneacetone (dba); dicyclohexyl[2,4',6'-tris(propan-2-yl)[1,1'-biphenyl]-2-yl]phosphane (XPhos), N,N-dimethylformamide (DMF), 3',6'-bis(1-methyl-2-phenylindolizin-3-yl)-3H-spiro[2-benzofuran-1,9'-xanthen]-3-one or rhodindolizine (RhIndz).

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a solvent," "a linear alkyl group," or "an alcohol," include, but are not limited to, mixtures or combinations of two or more such solvents, linear alkyl groups, or alcohols, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'."

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a NIR II dye for imaging of a biological sample refers to an amount that is sufficient to achieve the desired image quality. The specific level in terms of wt % or mol % in a composition required as an effective amount will depend upon a variety of factors including the absorption and emission maxima of the dye, whether the biological sample is an isolated sample or is part of an organism in vivo, the identity of any pharmaceutically acceptable carrier, and the capabilities of the device used to measure the fluorescence produced by the dye.

As used herein, the terms "optional" or "optionally" means that the subsequently described event or circumstance can or cannot occur, and that the description includes instances where said event or circumstance occurs and instances where it does not.

Unless otherwise specified, pressures referred to herein are based on atmospheric pressure (i.e. one atmosphere).

"NIR I" as used herein refers to the region of the electromagnetic spectrum having wavelengths from about 700 to about 900 nm, while "NIR II" refers to that region having wavelengths from about 900 nm to about 1700 nm. In one aspect, the compounds disclosed herein emit fluorescence and/or absorb radiation in the NIR II region.

"Photoluminescent" as used herein refers to a molecule capable of absorbing a photon, in turn exciting an electron in the molecule to a higher electronic excited state, and then radiating a photon as light as the electron returns to a lower energy state. In one aspect, the NIR II dyes and compositions disclosed herein are photoluminescent in the NIR II region.

As used herein, "fluorescence quantum yield" (φ) refers to the ratio of photons absorbed to photons emitted through fluorescence.

"Stokes shift" as used herein refers to the difference between the maximum position in an absorption band for a compound and the maximum position of fluorescence emission for the same compound. In one aspect, the NIR II dyes disclosed herein have a Stokes shift of 150 nm or greater in the NIR II region.

"Molar absorptivity," "molar absorption coefficient," "extinction coefficient," and "molar attenuation coefficient" (ε) refer to how strongly a chemical compound absorbs light at a given wavelength. Molar absorptivity is an intrinsic property of the compound; however, this coefficient varies with wavelength and solvent. Molar absorptivity is typically expressed in terms of absorption at a particular wavelength, such as the maximum position in the absorption band. Units are typically given as L/mol·cm or $M^{-1}·cm^{-1}$. In one aspect, the disclosed NIR II dyes have a high ε in the NIR II spectral region.

Chemical Groups and Substituents

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$— units in the polyester, regardless of whether ethylene glycol was used to prepare the polyester. Similarly, a sebacic acid residue in a polyester refers to one or more —$CO(CH_2)_8CO$— moieties in the polyester, regardless of whether the residue is obtained by reacting sebacic acid or an ester thereof to obtain the polyester.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. It is also contemplated that, in certain aspects, unless expressly indicated to the contrary, individual substituents can be further optionally substituted (i.e., further substituted or unsubstituted).

In defining various terms, "$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" or "aliphatic group," as used herein, denotes a hydrocarbon moiety that may be straight-chain (i.e., unbranched), branched, or cyclic (including fused, bridging, and spirofused polycyclic) and may be completely saturated or may contain one or more units of unsaturation, but which is not aromatic. Unless otherwise specified, aliphatic groups contain 1-20 carbon atoms. Aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms. The term alkyl group can also be a C1 alkyl, C1-C2 alkyl, C1-C3 alkyl, C1-C4 alkyl, C1-C5 alkyl, C1-C6 alkyl, C1-C7 alkyl, C1-C8 alkyl, C1-C9 alkyl, C1-C10 alkyl, and the like up to and including a C1-C24 alkyl.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halide, e.g., fluorine, chlorine, bromine, or iodine. Alternatively, the term "monohaloalkyl" specifically refers to an alkyl group that is substituted with a single halide, e.g. fluorine, chlorine, bromine, or iodine. The term "polyhaloalkyl" specifically refers to an alkyl group that is independently substituted with two or more halides, i.e. each halide substituent need not be the same halide as another halide substituent, nor do the multiple instances of a halide substituent need to be on the same carbon. The term "alkoxyalkyl" specifically refers to an alkyl group that is substituted with one or more alkoxy groups, as described below. The term "aminoalkyl" specifically refers to an alkyl group that is substituted with one or more amino groups. The term "hydroxyalkyl" specifically refers to an alkyl group that is substituted with one or more hydroxy groups. When "alkyl" is used in one instance and a specific term such as "hydroxyalkyl" is used in another, it is not meant to imply that the term "alkyl" does not also refer to specific terms such as "hydroxyalkyl" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, cycloalkyl, alkoxy, amino, ether, halide, hydroxy, nitro, silyl, sulfo-oxo, or thiol as described herein.

The term "alkanediyl" as used herein, refers to a divalent saturated aliphatic group, with one or two saturated carbon atom(s) as the point(s) of attachment, a linear or branched, cyclo, cyclic or acyclic structure, no carbon-carbon double or triple bonds, and no atoms other than carbon and hydrogen. The groups, —$CH_2$— (methylene), —$CH_2CH_2$—, —$CH_2C(CH_3)_2CH_2$—, and —$CH_2CH_2CH_2$— are non-limiting examples of alkanediyl groups.

The terms "alkoxy" and "alkoxyl" as used herein to refer to an alkyl or cycloalkyl group bonded through an ether linkage; that is, an "alkoxy" group can be defined as -$OA^1$ where $A^1$ is alkyl or cycloalkyl as defined above. "Alkoxy" also includes polymers of alkoxy groups as just described; that is, an alkoxy can be a polyether such as -$OA^1$-$OA^2$ or -$OA^1$-$(OA^2)_a$-$OA^3$, where "a" is an integer of from 1 to 200 and $A^1$, $A^2$, and $A^3$ are alkyl and/or cycloalkyl groups.

The term "aromatic group" as used herein refers to a ring structure having cyclic clouds of delocalized π electrons above and below the plane of the molecule, where the π clouds contain (4n+2) π electrons. A further discussion of aromaticity is found in Morrison and Boyd, Organic Chemistry, (5th Ed., 1987), Chapter 13, entitled "Aromaticity," pages 477-497, incorporated herein by reference. The term "aromatic group" is inclusive of both aryl and heteroaryl groups.

The term "aryl" as used herein is a group that contains any carbon-based aromatic group including, but not limited to, benzene, naphthalene, phenyl, biphenyl, anthracene, pyrene, and the like. The aryl group can be substituted or unsubstituted. The aryl group can be substituted with one or more groups including, but not limited to, alkyl, cycloalkyl, alkoxy, alkenyl, cycloalkenyl, alkynyl, cycloalkynyl, aryl, heteroaryl, aldehyde, —$NH_2$, carboxylic acid, ester, ether, halide, hydroxy, ketone, azide, nitro, silyl, sulfo-oxo, or thiol as described herein. The term "biaryl" is a specific type of aryl group and is included in the definition of "aryl." In addition, the aryl group can be a single ring structure or comprise multiple ring structures that are either fused ring structures or attached via one or more bridging groups such as a carbon-carbon bond. For example, biaryl to two aryl groups that are bound together via a fused ring structure, as in naphthalene, or are attached via one or more carbon-carbon bonds, as in biphenyl.

The term "aldehyde" as used herein is represented by the formula —C(O)H. Throughout this specification "C(O)" is a short hand notation for a carbonyl group, i.e., C=O.

The terms "amine" or "amino" as used herein are represented by the formula -$NA^1A^2$, where $A^1$ and $A^2$ can be, independently, hydrogen or alkyl, cycloalkyl, alkenyl, cycloalkenyl, alkynyl, cycloalkynyl, aryl, or heteroaryl group as described herein. A specific example of amino is —$NH_2$.

The term "alkylamino" as used herein is represented by the formula —NH(-alkyl) and —N(-alkyl)$_2$, where alkyl is a described herein. Representative examples include, but are not limited to, methylamino group, ethylamino group, propylamino group, isopropylamino group, butylamino group, isobutylamino group, (sec-butyl)amino group, (tert-butyl) amino group, pentylamino group, isopentylamino group, (tert-pentyl)amino group, hexylamino group, dimethylamino group, diethylamino group, dipropylamino group, diisopropylamino group, dibutylamino group, diisobutylamino group, di(sec-butyl)amino group, di(tert-butyl) amino group, dipentylamino group, diisopentylamino group, di(tert-pentyl)amino group, dihexylamino group, N-ethyl-N-methylamino group, N-methyl-N-propylamino group, N-ethyl-N-propylamino group and the like.

The term "carboxylic acid" as used herein is represented by the formula —C(O)OH.

The term "ester" as used herein is represented by the formula —OC(O)$A^1$ or —C(O)O$A^1$, where $A^1$ can be alkyl, cycloalkyl, alkenyl, cycloalkenyl, alkynyl, cycloalkynyl, aryl, or heteroaryl group as described herein. The term "polyester" as used herein is represented by the formula -($A^1$O(O)C-$A^2$-C(O)O)$_a$— or -($A^1$O(O)C-$A^2$-OC(O))$_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer from 1 to 500. "Polyester" is as the term used to describe a group that is produced by the reaction between a compound having at least two carboxylic acid groups with a compound having at least two hydroxyl groups.

The term "ether" as used herein is represented by the formula $A^1$O$A^2$, where $A^1$ and $A^2$ can be, independently, an alkyl, cycloalkyl, alkenyl, cycloalkenyl, alkynyl, cycloalkynyl, aryl, or heteroaryl group described herein. The term "polyether" as used herein is represented by the formula -($A^1$O-$A^2$O)$_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The terms "halo," "halogen" or "halide," as used herein can be used interchangeably and refer to F, Cl, Br, or I.

The terms "pseudohalide," "pseudohalogen" or "pseudohalo," as used herein can be used interchangeably and refer to functional groups that behave substantially similar to halides. Such functional groups include, by way of example, cyano, thiocyanato, azido, trifluoromethyl, trifluoromethoxy, perfluoroalkyl, and perfluoroalkoxy groups.

The term "heteroalkyl" as used herein refers to an alkyl group containing at least one heteroatom. Suitable heteroatoms include, but are not limited to, O, N, Si, P and S, wherein the nitrogen, phosphorous and sulfur atoms are optionally oxidized, and the nitrogen heteroatom is optionally quaternized. Heteroalkyls can be substituted as defined above for alkyl groups.

The term "heteroaryl" as used herein refers to an aromatic group that has at least one heteroatom incorporated within the ring of the aromatic group. Examples of heteroatoms include, but are not limited to, nitrogen, oxygen, sulfur, and phosphorus, where N-oxides, sulfur oxides, and dioxides are permissible heteroatom substitutions. The heteroaryl group can be substituted or unsubstituted. The heteroaryl group can be substituted with one or more groups including, but not limited to, alkyl, cycloalkyl, alkoxy, amino, ether, halide, hydroxy, nitro, silyl, sulfo-oxo, or thiol as described herein. Heteroaryl groups can be monocyclic, or alternatively fused ring systems. Heteroaryl groups include, but are not limited to, furyl, imidazolyl, pyrimidinyl, tetrazolyl, thienyl, pyridinyl, pyrrolyl, N-methylpyrrolyl, quinolinyl, isoquinolinyl, pyrazolyl, triazolyl, thiazolyl, oxazolyl, isoxazolyl, oxadiazolyl, thiadiazolyl, isothiazolyl, pyridazinyl, pyrazinyl, benzofuranyl, benzodioxolyl, benzothiophenyl, indolyl, indazolyl, benzimidazolyl, imidazopyridinyl, pyrazolopyridinyl, and pyrazolopyrimidinyl. Further not limiting examples of heteroaryl groups include, but are not limited to, pyridinyl, pyridazinyl, pyrimidinyl, pyrazinyl, thiophenyl, pyrazolyl, imidazolyl, benzo[d]oxazolyl, benzo[d]thiazolyl, quinolinyl, quinazolinyl, indazolyl, imidazo[1,2-b]pyridazinyl, imidazo[1,2-a]pyrazinyl, benzo[c][1,2,5]thiadiazolyl, benzo[c][1,2,5]oxadiazolyl, and pyrido[2,3-b]pyrazinyl.

The terms "heterocycle" or "heterocyclyl," as used herein can be used interchangeably and refer to single and multi-cyclic aromatic or non-aromatic ring systems in which at least one of the ring members is other than carbon. Thus, the term is inclusive of, but not limited to, "heterocycloalkyl," "heteroaryl," "bicyclic heterocycle," and "polycyclic heterocycle." Heterocycle includes pyridine, pyrimidine, furan, thiophene, pyrrole, isoxazole, isothiazole, pyrazole, oxazole, thiazole, imidazole, oxazole, including, 1,2,3-oxadiazole, 1,2,5-oxadiazole and 1,3,4-oxadiazole, thiadiazole, including, 1,2,3-thiadiazole, 1,2,5-thiadiazole, and 1,3,4-thiadiazole, triazole, including, 1,2,3-triazole, 1,3,4-triazole, tetrazole, including 1,2,3,4-tetrazole and 1,2,4,5-tetrazole, pyridazine, pyrazine, triazine, including 1,2,4-triazine and 1,3,5-triazine, tetrazine, including 1,2,4,5-tetrazine, pyrrolidine, piperidine, piperazine, morpholine, azetidine, tetrahydropyran, tetrahydrofuran, dioxane, and the like. The term heterocyclyl group can also be a C2 heterocyclyl, C2-C3 heterocyclyl, C2-C4 heterocyclyl, C2-C5 heterocyclyl, C2-C6 heterocyclyl, C2-C7 heterocyclyl, C2-C8 heterocyclyl, C2-C9 heterocyclyl, C2-C10 heterocyclyl, C2-C11 heterocyclyl, and the like up to and including a C2-C18 heterocyclyl. For example, a C2 heterocyclyl comprises a group which has two carbon atoms and at least one heteroatom, including, but not limited to, aziridinyl, diazetidinyl, dihydrodiazetyl, oxiranyl, thiiranyl, and the like. Alternatively, for example, a C5 heterocyclyl comprises a group which has five carbon atoms and at least one heteroatom, including, but not limited to, piperidinyl, tetrahydropyranyl, tetrahydrothiopyranyl, diazepanyl, pyridinyl, and the like. It is understood that a heterocyclyl group may be bound either through a heteroatom in the ring, where chemically possible, or one of carbons comprising the heterocyclyl ring.

The term "bicyclic heterocycle" or "bicyclic heterocyclyl," as used herein refers to a ring system in which at least one of the ring members is other than carbon. Bicyclic heterocyclyl encompasses ring systems wherein an aromatic ring is fused with another aromatic ring, or wherein an aromatic ring is fused with a non-aromatic ring. Bicyclic heterocyclyl encompasses ring systems wherein a benzene ring is fused to a 5- or a 6-membered ring containing 1, 2 or 3 ring heteroatoms or wherein a pyridine ring is fused to a 5- or a 6-membered ring containing 1, 2 or 3 ring heteroatoms. Bicyclic heterocyclic groups include, but are not limited to, indolyl, indazolyl, pyrazolo[1,5-a]pyridinyl, benzofuranyl, quinolinyl, quinoxalinyl, 1,3-benzodioxolyl, 2,3-dihydro-1,4-benzodioxinyl, 3,4-dihydro-2H-chromenyl, 1H-pyrazolo[4,3-c]pyridin-3-yl; 1H-pyrrolo[3,2-b]pyridin-3-yl; and 1H-pyrazolo[3,2-b]pyridin-3-yl.

The term "heterocycloalkyl" as used herein refers to an aliphatic, partially unsaturated or fully saturated, 3- to 14-membered ring system, including single rings of 3 to 8 atoms and bi- and tricyclic ring systems. The heterocycloalkyl ring-systems include one to four heteroatoms independently selected from oxygen, nitrogen, and sulfur, wherein a nitrogen and sulfur heteroatom optionally can be oxidized and a nitrogen heteroatom optionally can be substituted. Representative heterocycloalkyl groups include, but are not limited to, pyrrolidinyl, pyrazolinyl, pyrazolidinyl, imidazolinyl, imidazolidinyl, piperidinyl, piperazinyl, oxazolidinyl, isoxazolidinyl, morpholinyl, thiazolidinyl, isothiazolidinyl, and tetrahydrofuryl.

The term "hydroxyl" or "hydroxy" as used herein is represented by the formula —OH.

The term "ketone" as used herein is represented by the formula $A^1C(O)A^2$, where $A^1$ and $A^2$ can be, independently, an alkyl, cycloalkyl, alkenyl, cycloalkenyl, alkynyl, cycloalkynyl, aryl, or heteroaryl group as described herein.

The term "azide" or "azido" as used herein is represented by the formula $—N_3$.

The term "nitro" as used herein is represented by the formula $—NO_2$.

The term "nitrile" or "cyano" as used herein is represented by the formula —CN.

As described herein, compounds of the invention may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. In is also contemplated that, in certain aspects, unless expressly indicated to the contrary, individual substituents can be further optionally substituted (i.e., further substituted or unsubstituted).

Suitable monovalent substituents on a substitutable carbon atom of an "optionally substituted" group are independently halogen; $—(CH_2)_{0-4}R°$; $—(CH_2)_{0-4}OR°$; $—O(CH_2)_{0-4}R°$, $—O—(CH_2)_{0-4}C(O)OR°$; $—(CH_2)_{0-4}CH(OR°)_2$; $—(CH_2)_{0-4}SR°$; $—(CH_2)_{0-4}Ph$, which may be substituted with $R°$; $—(CH_2)_{0-4}O(CH_2)_{0-1}Ph$ which may be substituted with $R°$; —CH═CHPh, which may be substituted with $R°$; $—(CH_2)_{0-4}O(CH_2)_{0-1}$-pyridyl which may be substituted with $R°$; $—NO_2$; —CN; $—N_3$; $—(CH_2)_{0-4}N(R°)_2$; $—(CH_2)_{0-4}N(R°)C(O)R°$; $—N(R°C(S)R°$; $—(CH_2)_{0-4}N(R°C(O)NR°_2$; $—N(R°C(S)NR°_2$; $—(CH_2)_{0-4}N(R°C(O)OR°$; $—N(R°)N(R°)C(O)R°$; $—N(R°N(R°C(O)NR°_2$; $—N(R°N(R°C(O)OR°$; $(CH_2)_{0-4}$ (O)$R°$; —C(S)$R°$; $(CH_2)_{0-4}C(O)OR°$; $—(CH_2)_{0-4}C(O)SR°$; $—(CH_2)_{0-4}C(O)OSiR°_3$; $—(CH_2)_{0-4}OC(O)R°$; $—OC(O)(CH_2)_{0-4}SR—$, $SC(S)SR°$; $—(CH_2)_{0-4}$ $SC(O)R°$; $—(CH_2)_{0-4}C(O)NR°_2$; $—C(S)NR°_2$; $—C(S)SR°$; $—(CH_2)_{0-4}OC(O)NR°_2$; —C(O)N(OR°)R°; —C(O)C(O)R°; —C(O)CH$_2$C(O)R°; —C(NOR°)R°; $—(CH_2)_{0-4}$ SSR°; $—(CH_2)_{0-4}S(O)_2R°$; $—(CH_2)_{0-4}S(O)_2OR°$; $—(CH_2)_{0-4}OS(O)_2R°$; —S(O)$_2$NR°$_2$; $—(CH_2)_{0-4}S(O)R°$; $—N(R°S(O)_2NR°_2$; —N(R°S(O)$_2$ R°; —N(OR°)R°; —C(NH)NR°$_2$; $—P(O)_2R°$; —P(O)R°$_2$; —OP(O)R°$_2$; —OP(O)(OR°)$_2$; SiR°$_3$; —(C$_{1-4}$ straight or branched alkylene)O- N(R°)$_2$; or —(C$_{1-4}$ straight or branched)alkylene)C(O)ON—(R°$_2$, wherein each R° may be substituted as defined below and is independently hydrogen, C$_{1-6}$ aliphatic, —CH$_2$Ph, —O(CH$_2$)$_{0-1}$Ph, —CH$_2$-(5-6 membered heteroaryl ring), or a 5-6-membered saturated, partially unsaturated, or aryl ring having 0-4 heteroatoms independently selected from nitrogen, oxygen, or sulfur, or, notwithstanding the definition above, two independent occurrences of R°, taken together with their intervening atom(s), form a 3-12-membered saturated, partially unsaturated, or aryl mono- or bicyclic ring having 0-4 heteroatoms independently selected from nitrogen, oxygen, or sulfur, which may be substituted as defined below.

Suitable monovalent substituents on R° (or the ring formed by taking two independent occurrences of R° together with their intervening atoms), are independently halogen, $—(CH_2)_{0-2}R^●$, -(haloR$^●$), $—(CH_2)_{0-2}OH$, $—(CH_2)_{0-2}OR^●$, $—(CH_2)_{0-2}CH(OR^●)_2$; —O(haloR), —CN, $—N_3$, $—(CH_2)_{0-2}C(O)R^●$, $—(CH_2)_{0-2}C(O)OH$, $—(CH_2)_{0-2}C(O)OR^●$, $—(CH_2)_{0-2}SR^●$, $—(CH_2)_{0-2}SH$, $—(CH_2)_{0-2}NH_2$, $—(CH_2)_{0-2}NHR^●$, $—(CH_2)_{0-2}NR^●_2$, $—NO_2$, $—SiR^●_3$, $—OSiR^●_3$, $—C(O)SR^●$, —(C$_{1-4}$ straight or branched alkylene)C(O)OR$^●$, or —SSR$^●$ wherein each R$^●$ is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R° include ═O and ═S.

Suitable divalent substituents on a saturated carbon atom of an "optionally substituted" group include the following: ═O, ═S, ═NNR*$_2$, ═NNHC(O)R*, ═NNHC(O)OR*, ═NNHS(O)$_2$R*, ═NR*, ═NOR—, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R$^●$, -(haloR$^●$), —OH, —OR$^●$, —O(haloR$^●$), —CN, —C(O)OH, —C(O)OR$^●$, —NH$_2$, —NHR$^●$, —NR$^●_2$, or —NO$_2$, wherein each R$^●$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^†$, —NR$^†_2$, —C(O)R$^†$, —C(O)OR$^†$, —C(O)C(O)R$^†$, —C(O)CH$_2$C(O) R$^†$, —S(O)$_2$R$^†$, —S(O)$_2$NR$^†_2$, —C(S)NR$^†_2$, —C(NH)NR$^†_2$, or —N(R$^†$)S(O)$_2$R$^†$; wherein each R$^†$ is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^†$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^†$ are independently halogen, —R$^●$, -(haloR$^●$), —OH, —OR$^●$, —O(haloR$^●$), —ON, —C(O)OH, —C(O)OR$^●$, —NH$_2$, —NHR$^●$, —NR$^●_2$, or —NO$_2$, wherein each R$^●$ is unsubstituted or where preceded by "halo" is substituted only with one or more halogens, and is independently 01-4 aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

The term "leaving group" refers to an atom (or a group of atoms) with electron withdrawing ability that can be displaced as a stable species, taking with it the bonding electrons. Examples of suitable leaving groups include halides and sulfonate esters, including, but not limited to, triflate, mesylate, tosylate, and brosylate.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-thiazolidinedione radical in a particular compound has the structure:

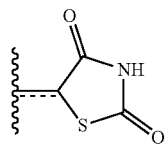

regardless of whether thiazolidinedione is used to prepare the compound. In some embodiments the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5, 6, 7, 8-tetrahydro-2-naphthyl radical. In some embodiments, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkyl-carboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

"Inorganic radicals," as the term is defined and used herein, contain no carbon atoms and therefore comprise only atoms other than carbon. Inorganic radicals comprise bonded combinations of atoms selected from hydrogen, nitrogen, oxygen, silicon, phosphorus, sulfur, selenium, and halogens such as fluorine, chlorine, bromine, and iodine, which can be present individually or bonded together in their chemically stable combinations. Inorganic radicals have 10 or fewer, or preferably one to six or one to four inorganic atoms as listed above bonded together. Examples of inorganic radicals include, but not limited to, amino, hydroxy, halogens, nitro, thiol, sulfate, phosphate, and like commonly known inorganic radicals. The inorganic radicals do not have bonded therein the metallic elements of the periodic table (such as the alkali metals, alkaline earth metals, transition metals, lanthanide metals, or actinide metals), although such metal ions can sometimes serve as a pharmaceutically acceptable cation for anionic inorganic radicals such as a sulfate, phosphate, or like anionic inorganic radical. Inorganic radicals do not comprise metalloids elements such as boron, aluminum, gallium, germanium, arsenic, tin, lead, or tellurium, or the noble gas elements, unless otherwise specifically indicated elsewhere herein.

Compounds described herein can contain one or more double bonds and, thus, potentially give rise to cis/trans (E/Z) isomers, as well as other conformational isomers. Unless stated to the contrary, the invention includes all such possible isomers, as well as mixtures of such isomers.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers.

Many organic compounds exist in optically active forms having the ability to rotate the plane of plane-polarized light. In describing an optically active compound, the prefixes D and L or R and S are used to denote the absolute configuration of the molecule about its chiral center(s). The prefixes d and l or (+) and (−) are employed to designate the sign of rotation of plane-polarized light by the compound, with (−) or meaning that the compound is levorotatory. A compound prefixed with (+) or d is dextrorotatory. For a given chemical structure, these compounds, called stereoisomers, are identical except that they are non-superimposable mirror images of one another. A specific stereoisomer can also be referred to as an enantiomer, and a mixture of such isomers is often called an enantiomeric mixture. A 50:50 mixture of enantiomers is referred to as a racemic mixture. Many of the compounds described herein can have one or more chiral centers and therefore can exist in different enantiomeric forms. If desired, a chiral carbon can be designated with an asterisk (*). When bonds to the chiral carbon are depicted as straight lines in the disclosed formulas, it is understood that both the (R) and (S) configurations of the chiral carbon, and hence both enantiomers and mixtures thereof, are embraced within the formula. As is used in the art, when it is desired to specify the absolute configuration about a chiral carbon, one of the bonds to the chiral carbon can be depicted as a wedge (bonds to atoms above the plane) and the other can be depicted as a series or wedge of short parallel lines is (bonds to atoms below the plane). The Cahn-Ingold-Prelog system can be used to assign the (R) or (S) configuration to a chiral carbon.

Compounds described herein comprise atoms in both their natural isotopic abundance and in non-natural abundance. The disclosed compounds can be isotopically-labeled or isotopically-substituted compounds identical to those described, but for the fact that one or more atoms are replaced by an atom having an atomic mass or mass number different from the atomic mass or mass number typically found in nature. Examples of isotopes that can be incorporated into compounds of the invention include isotopes of hydrogen, carbon, nitrogen, oxygen, sulfur, fluorine and chlorine, such as $^{2}H$, $^{3}H$, $^{13}C$, $^{14}C$, $^{15}N$, $^{18}O$, $^{17}O$, $^{35}S$, $^{18}F$, and $^{36}Cl$, respectively. Compounds further comprise prodrugs thereof and pharmaceutically acceptable salts of said compounds or of said prodrugs which contain the aforementioned isotopes and/or other isotopes of other atoms are within the scope of this invention. Certain isotopically-labeled compounds of the present invention, for example those into which radioactive isotopes such as $^{3}H$ and $^{14}C$ are incorporated, are useful in drug and/or substrate tissue distribution assays. Tritiated, i.e., $^{3}H$, and carbon-14, i.e., $^{14}C$, isotopes are particularly preferred for their ease of preparation and detectability. Further, substitution with heavier isotopes such as deuterium, i.e., $^{2}H$, can afford certain therapeutic advantages resulting from greater metabolic stability, for example increased in vivo half-life or reduced dosage requirements and, hence, may be preferred in some circumstances. Isotopically labeled compounds of the present invention and prodrugs thereof can generally be prepared by carrying out the procedures below, by substituting a readily available isotopically labeled reagent for a non-isotopically labeled reagent.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Pharmaceutically Acceptable Carriers and Biocompatibility

In various aspects, the present disclosure relates to pharmaceutical compositions comprising a therapeutically effective amount of at least one disclosed compound, at least one product of a disclosed method, or a pharmaceutically acceptable salt thereof. As used herein, "pharmaceutically-acceptable carriers" means one or more of a pharmaceutically acceptable diluents, preservatives, antioxidants, solubilizers, emulsifiers, coloring agents, releasing agents, coating agents, sweetening, flavoring and perfuming agents, and adjuvants. The disclosed pharmaceutical compositions can be conveniently presented in unit dosage form and prepared by any of the methods well known in the art of pharmacy and pharmaceutical sciences.

In a further aspect, the disclosed pharmaceutical compositions comprise a therapeutically effective amount of at least one disclosed compound, at least one product of a disclosed method, or a pharmaceutically acceptable salt thereof as an active ingredient, a pharmaceutically acceptable carrier, optionally one or more other therapeutic agent, and optionally one or more adjuvant. The disclosed pharmaceutical compositions include those suitable for oral, rectal, topical, pulmonary, nasal, and parenteral administration, although the most suitable route in any given case will depend on the particular host, and nature and severity of the conditions for which the active ingredient is being administered. In a further aspect, the disclosed pharmaceutical composition can be formulated to allow administration orally, nasally, via inhalation, parenterally, paracancerally, transmucosally, transdermally, intramuscularly, intravenously, intradermally, subcutaneously, intraperitonealy, intraventricularly, intracranially and intratumorally.

As used herein, "parenteral administration" includes administration by bolus injection or infusion, as well as administration by intravenous, intramuscular, intraarterial, intrathecal, intracapsular, intraorbital, intracardiac, intradermal, intraperitoneal, transtracheal, subcutaneous, subcuticular, intraarticular, subcapsular subarachnoid, intraspinal, epidural and intrasternal injection and infusion.

In various aspects, the present disclosure also relates to a pharmaceutical composition comprising a pharmaceutically acceptable carrier or diluent and, as active ingredient, a therapeutically effective amount of a disclosed compound, a product of a disclosed method of making, a pharmaceutically acceptable salt, a hydrate thereof, a solvate thereof, a polymorph thereof, or a stereochemically isomeric form thereof. In a further aspect, a disclosed compound, a product of a disclosed method of making, a pharmaceutically acceptable salt, a hydrate thereof, a solvate thereof, a polymorph thereof, or a stereochemically isomeric form thereof, or any subgroup or combination thereof may be formulated into various pharmaceutical forms for administration purposes.

The carrier can take a wide variety of forms depending on the form of preparation desired for administration, e.g., oral or parenteral (including intravenous). Thus, the pharmaceutical compositions of the present disclosure can be presented as discrete units suitable for oral administration such as capsules, cachets or tablets each containing a predetermined amount of the active ingredient. Further, the compositions can be presented as a powder, as granules, as a solution, as a suspension in an aqueous liquid, as a non-aqueous liquid, as an oil-in-water emulsion or as a water-in-oil liquid emulsion. In addition to the common dosage forms set out above, the compounds of the present disclosure, and/or pharmaceutically acceptable salt(s) thereof, can also be administered by controlled release means and/or delivery devices. The compositions can be prepared by any of the methods of pharmacy. In general, such methods include a step of bringing into association the active ingredient with the carrier that constitutes one or more necessary ingredients. In general, the compositions are prepared by uniformly and intimately admixing the active ingredient with liquid carriers or finely divided solid carriers or both. The product can then be conveniently shaped into the desired presentation.

Techniques and compositions for making dosage forms useful for materials and methods described herein are described, for example, in the following references: Modern Pharmaceutics, Chapters 9 and 10 (Banker & Rhodes, Editors, 1979); Pharmaceutical Dosage Forms: Tablets (Lieberman et al., 1981); Ansel, Introduction to Pharmaceutical Dosage Forms 2nd Edition (1976); Remington's Pharmaceutical Sciences, 17th ed. (Mack Publishing Company, Easton, Pa., 1985); Advances in Pharmaceutical Sciences (David Ganderton, Trevor Jones, Eds., 1992); Advances in Pharmaceutical Sciences Vol 7. (David Ganderton, Trevor Jones, James McGinity, Eds., 1995); Aqueous Polymeric Coatings for Pharmaceutical Dosage Forms (Drugs and the Pharmaceutical Sciences, Series 36 (James McGinity, Ed., 1989); Pharmaceutical Particulate Carriers: Therapeutic Applications: Drugs and the Pharmaceutical Sciences, Vol 61 (Alain Rolland, Ed., 1993); Drug Delivery to the Gastrointestinal Tract (Ellis Horwood Books in the Biological Sciences. Series in Pharmaceutical Technology; J. G. Hardy, S. S. Davis, Clive G. Wilson, Eds.); Modern Pharmaceutics Drugs and the Pharmaceutical Sciences, Vol 40 (Gilbert S. Banker, Christopher T. Rhodes, Eds.).

The compounds described herein are typically to be administered in admixture with suitable pharmaceutical diluents, excipients, extenders, or carriers (termed herein as a pharmaceutically acceptable carrier, or a carrier) suitably selected with respect to the intended form of administration and as consistent with conventional pharmaceutical practices. The deliverable compound will be in a form suitable for oral, rectal, topical, intravenous injection or parenteral administration. Carriers include solids or liquids, and the type of carrier is chosen based on the type of administration being used. The compounds may be administered as a dosage that has a known quantity of the compound.

Because of the ease in administration, oral administration can be a preferred dosage form, and tablets and capsules represent the most advantageous oral dosage unit forms in which case solid pharmaceutical carriers are obviously employed. However, other dosage forms may be suitable depending upon clinical population (e.g., age and severity of clinical condition), solubility properties of the specific disclosed compound used, and the like. Accordingly, the disclosed compounds can be used in oral dosage forms such as pills, powders, granules, elixirs, tinctures, suspensions, syrups, and emulsions. In preparing the compositions for oral dosage form, any convenient pharmaceutical media can be employed. For example, water, glycols, oils, alcohols, flavoring agents, preservatives, coloring agents and the like can be used to form oral liquid preparations such as suspensions, elixirs and solutions; while carriers such as starches, sugars, microcrystalline cellulose, diluents, granulating agents, lubricants, binders, disintegrating agents, and the like can be used to form oral solid preparations such as powders, capsules and tablets. Because of their ease of administration, tablets and capsules are the preferred oral dosage units whereby solid pharmaceutical carriers are employed. Optionally, tablets can be coated by standard aqueous or nonaqueous techniques.

Moreover, suitable binders, lubricants, disintegrating agents, coloring agents, flavoring agents, flow-inducing agents, and melting agents may be included as carriers. The pharmaceutical carrier employed can be, for example, a solid, liquid, or gas. Examples of solid carriers include, but are not limited to, lactose, terra alba, sucrose, glucose, methylcellulose, dicalcium phosphate, calcium sulfate, mannitol, sorbitol talc, starch, gelatin, agar, pectin, acacia, magnesium stearate, and stearic acid. Examples of liquid carriers are sugar syrup, peanut oil, olive oil, and water. Examples of gaseous carriers include carbon dioxide and nitrogen.

Pharmaceutical compositions of the present disclosure suitable for parenteral administration can include sterile aqueous or oleaginous solutions, suspensions, or dispersions. Furthermore, the compositions can be in the form of sterile powders for the extemporaneous preparation of such sterile injectable solutions or dispersions. In some aspects, the final injectable form is sterile and must be effectively fluid for use in a syringe. The pharmaceutical compositions should be stable under the conditions of manufacture and storage; thus, preferably should be preserved against the contaminating action of microorganisms such as bacteria and fungi. The carrier can be a solvent or dispersion medium containing, for example, water, ethanol, polyol (e.g., glycerol, propylene glycol and liquid polyethylene glycol), vegetable oils, and suitable mixtures thereof.

Injectable solutions, for example, can be prepared in which the carrier comprises saline solution, glucose solution or a mixture of saline and glucose solution. Injectable suspensions may also be prepared in which case appropriate liquid carriers, suspending agents and the like may be employed. In some aspects, a disclosed parenteral formulation can comprise about 0.01-0.1 M, e.g. about 0.05 M, phosphate buffer. In a further aspect, a disclosed parenteral formulation can comprise about 0.9% saline.

In various aspects, a disclosed parenteral pharmaceutical composition can comprise pharmaceutically acceptable carriers such as aqueous or non-aqueous solutions, suspensions, and emulsions. Examples of non-aqueous solvents are propylene glycol, polyethylene glycol, vegetable oils such as olive oil, and injectable organic esters such as ethyl oleate. Aqueous carriers include but not limited to water, alcoholic/aqueous solutions, emulsions or suspensions, including saline and buffered media. Parenteral vehicles can include mannitol, normal serum albumin, sodium chloride solution, Ringer's dextrose, dextrose and sodium chloride, lactated Ringer's and fixed oils. Intravenous vehicles include fluid and nutrient replenishers, electrolyte replenishers such as those based on Ringer's dextrose, and the like. Preservatives and other additives may also be present, such as, for example, antimicrobials, antioxidants, chelating agents, inert gases and the like. In a further aspect, a disclosed parenteral pharmaceutical composition can comprise may contain minor amounts of additives such as substances that enhance isotonicity and chemical stability, e.g., buffers and preservatives. Also contemplated for injectable pharmaceutical compositions are solid form preparations that are intended to be converted, shortly before use, to liquid form preparations. Furthermore, other adjuvants can be included to render the formulation isotonic with the blood of the subject or patient.

As used herein, "biocompatible" refers to a material or composition that does not cause harm to living tissue. In one aspect, the NIR II dyes disclosed herein are biocompatible.

As used herein, "nontoxic" refers to a material or composition that does not kill cells or organisms. In a further aspect, the NIR II dyes disclosed herein are nontoxic.

NIR II Dyes

In one aspect, disclosed herein is a near infrared II (NIR II) dye, the dye having a structure of Formula I:

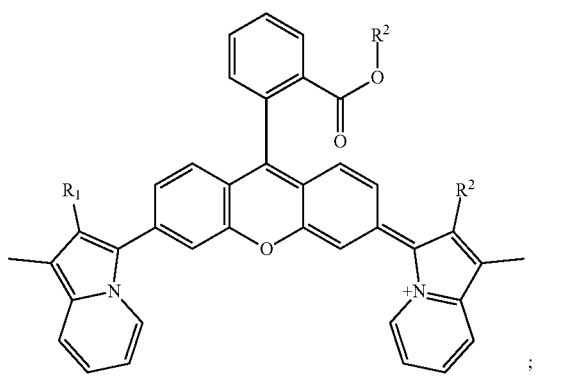

Formula I wherein $R^1$ is selected from a substituted or unsubstituted C1-C10 linear or branched alkyl group, a substituted or unsubstituted C1-C10 linear or branched alkoxy group, a C3-C10 cycloalkyl group, a substituted or unsubstituted aryl or heteroaryl group, or any combination thereof; and wherein R-2- is selected from a C10-C10 linear or branched alkyl group, a C3-C10 cycloalkyl group, or any combination thereof.

In some aspects, the compound of Formula I is accompanied by a counter-ion such as, for example, chloride, bromide, iodide, nitrate, nitrite, sulfate, phosphate, bicarbonate, or any combination thereof. In another aspect, $R^1$ can be selected from phenyl, 4-cyano phenyl, 4-trifluoromethylphenyl, 4-nitrophenyl, 3,5-bis-trifluoromethylphenyl, 4-hydroxyphenyl, 4-methoxyphenyl, -Ph-4-O(CH$_2$)$_4$SO$_3$H, or any combination thereof and the counter ion can be chloride.

In still another aspect, the NIR II dye can be

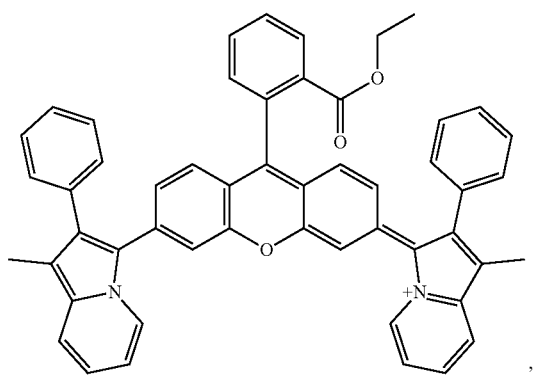

-continued

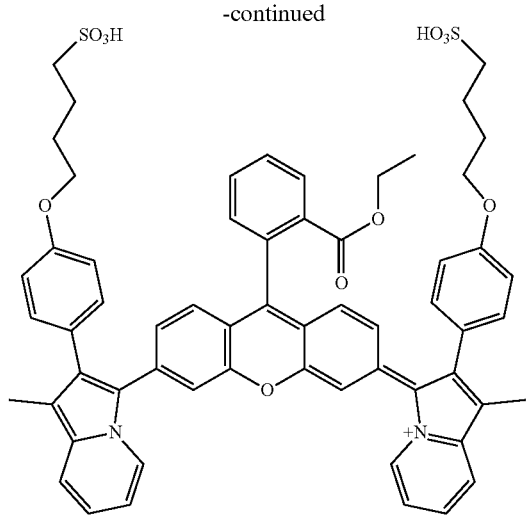

or any combination thereof.

In one aspect, the NIR II dye can be soluble in at least one solvent such as, for example, water, acetone, chloroform, dichloromethane, dimethylformamide, DMSO, ethyl acetate, ethanol, methanol, tetrahydrofuran, toluene, or any combination thereof.

In a further aspect, the NIR II dye can have a dielectric constant of from about 1 to about 50 in the solvent, or of about 1, 5, 10, 15, 20, 25, 30, 35, 40, 45, or about 50, or a combination of any of the foregoing values, or a range encompassing any of the foregoing values.

In another aspect, the NIR II dye can have a dipole moment of from about 0.3 to about 4 Debye in the solvent, or of about 0.3, 0.5, 1, 1.5, 2, 2.5, 3, 3.5, or about 4, or a combination of any of the foregoing values, or a range encompassing any of the foregoing values.

In one aspect, the NIR II dye can have an absorption maximum at from about 890 nm to about 930 nm, or of about 890, 895, 900, 905, 910, 915, 920, 925, or about 930 nm, or a combination of any of the foregoing values, or a range encompassing any of the foregoing values.

In a further aspect, the NIR II dye can have a fluorescence emission maximum at from about 1010 nm to about 1095 nm, or of about 1010, 1015, 1020, 1025, 1030, 1035, 1040, 1045, 1050, 1055, 1060, 1065, 1070, 1075, 1080, 1085, 1090, or about 1095 nm, or a combination of any of the foregoing values, or a range encompassing any of the foregoing values.

In one aspect, the NIR II dye has an absorption maximum at about 920 nm and an emission maximum at about 1092 nm. In another aspect, the NIR II dye has a molar absorption coefficient of about 90,000 $M^{-1} \cdot cm^{-1}$ or greater, or of about 90,500, 91,000, 91,500, 92,000, 92,500, 93,000, 93,500, 94,000, 94,500, or about 95,000 $M^{-1} \cdot cm^{-1}$ or greater, or a combination of any of the foregoing values, or a range encompassing any of the foregoing values. In still another aspect, the NIR II dye has a fluorescence quantum yield of 0.03 or greater, or of 0.03, 0.04, 0.05, 0.06, 0.07, 0.08, 0.09, or 0.10 or greater, or a combination of any of the foregoing values, or a range encompassing any of the foregoing values.

In still another aspect, the NIR II dye has a Stokes shift in the NIR II region of 150 nm or greater, or of 150, 160, 170, 180, 190, or 200 nm or greater, or a combination of any of the foregoing values, or a range encompassing any of the foregoing values.

Methods for Making NIR II Dyes

In an aspect, disclosed herein is a method of making an NIR II dye, the method including at least the following steps:
(a) admixing a compound of Formula II and a compound of Formula III in a solvent to form a reaction mixture, Formula II

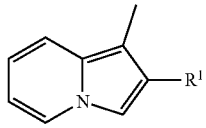

Formula III

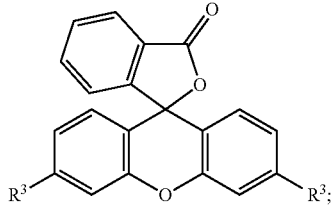

wherein $R^1$ comprises a substituted or unsubstituted C1-C10 linear or branched alkyl group, a substituted or unsubstituted C1-C10 linear or branched alkoxy group, a C3-C10 cycloalkyl group, a substituted or unsubstituted aryl or heteroaryl group, or any combination thereof;
wherein $R^3$ comprises a halogen, triflate, tosylate, mesylate, nitrate, phosphate, an alkoxy group, or any combination thereof;
(b) heating the reaction mixture to form a compound of Formula IV Formula IV

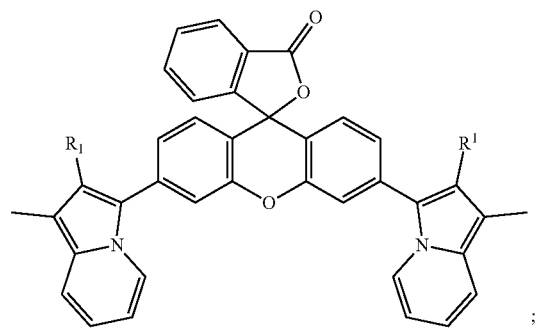

(c) admixing the compound of Formula IV with a source of a leaving group to form an acid leaving group derivative; and
(d) reacting the acid leaving group derivative with an alcohol to form the NIR II dye.

In a further aspect, $R^1$ can be selected from $R^1$ is selected from phenyl, 4-cyano phenyl, 4-trifluoromethylphenyl, 4-nitrophenyl, 3,5-bis-trifluoromethylphenyl, 4-hydroxyphenyl, 4-methoxyphenyl, -Ph-4-O(CH$_2$)$_4$SO$_3$H, or any combination thereof. In another aspect, the alcohol can be selected from methyl alcohol, ethyl alcohol, isopropyl alcohol, t-butyl alcohol, or any combination thereof.

In one aspect, the solvent can be selected from N-methyl-2-pyrrolidone (NMP), N,N-dimethylacetamide (DMA), dimethylformamide (DMF), toluene, tetrahydrofuran (THF), dioxane, or any combination thereof.

In one aspect, in step (b), the reaction mixture can be heated at a temperature of form about 80° C. to about 150° C., or at about 80, 85, 90, 95, 100, 105, 110, 115, 120, 125, 130, 135, 140, 145, or about 150° C., or a combination of any of the foregoing values, or a range encompassing any of the foregoing values. In another aspect, the reaction mixture can be heated for from about 6 hours to about 24 hours, or for about 6, 6.5, 7, 7.5, 8, 8.5, 9, 9.5, 10, 11, 12, 13, 14, 15, 16, 17, 18, 19, 20, 21, 22, 23, or about 24 hours, or a combination of any of the foregoing values, or a range encompassing any of the foregoing values. In one aspect, step (b) can be conducted in an inert atmosphere such as, for example, nitrogen.

In one aspect, step (a) further includes admixing a catalyst with the compound of Formula II and the compound of Formula III. In one aspect, the catalyst can be $PdCl_2(PPh_3)_2$, $Pd(OAc)_2$, $Pd(dba)_3 \cdot CHCl_3$, or any combination thereof. In a further aspect, from about 0.05 to about 0.1 moles of catalyst can be used per mole of compound of Formula II. Further in this aspect, about 0.05, 0.06, 0.07, 0.08, 0.09, or about 0.1 moles of catalyst can be used, or a combination of any of the foregoing values, or a range encompassing any of the foregoing values.

In another aspect, step (a) further includes admixing a base with the compound of Formula II and the compound of Formula III. In still another aspect, the base can be KOAc, NOAc, $Cs_2CO_3$, KO$^t$Bu, NaO$^t$Bu, $K_2CO_3$, $Na_2CO_3$, or any combination thereof. In one aspect, from about 3.0 moles to about 6.0 moles of base can be used per mole of compound of Formula II. Further in this aspect, about 3.0, 3.5, 4.0, 4.5, 5.0, 5.5, or about 6.0 moles of base can be used, or a combination of any of the foregoing values, or a range encompassing any of the foregoing values.

In still another aspect, step (a) further includes admixing a ligand with the compound of Formula II and the compound of Formula III. In a further aspect, the ligand can be $PPh_3$, XPhos, BINAP, ($^t$Bu)$_2$PMeHBF$_4$, or any combination thereof. In an aspect, from about 0.075 to about 0.2 moles of ligand can be used per mole of compound of Formula II, or about 0.075, 0.1, 0.125, 0.15, 0.175, or about 0.2 moles of ligand can be used, or a combination of any of the foregoing values, or a range encompassing any of the foregoing values.

In one aspect, step (a) further includes admixing an additive with the compound of Formula II and the compound of Formula III. In another aspect, the additive can be pivalic acid. In one aspect, about 0.3 moles of additive can be used per mole of compound of Formula II.

In another aspect, the source of leaving group can be a halogenating agent. In a further aspect, the halogenating agent can be a phosphorus halide, a dialkyl chloroiminium salt, a diaryl chloroiminium salt, an oxalyl halide, a carbonyl dihalide, or any combination thereof. In still another aspect, the phosphorus halide has the formula $PW_3$, $POW_3$, or $PW_5$, wherein W is Cl, Br, or I.

Also disclosed are NIR II dyes produced by the disclosed methods.

Compositions, Methods, and Devices Using the NIR II Dyes

In one aspect, disclosed herein is a composition including an NIR II dye disclosed herein or a salt thereof and a carrier. In a further aspect, the carrier can be a pharmaceutically-acceptable carrier. In still another aspect, the compositions can be biocompatible and/or nontoxic.

Also disclosed herein are methods for imaging a biological sample. In one aspect, the method includes the steps of (a) contacting the biological sample with a disclosed composition; (b) exposing the biological sample and the composition to NIR II radiation; and (c) observing NIR II fluorescence emission in the biological sample. In a further aspect, the biological sample includes an organelle, a cell, a tissue, an organ, or any combination thereof.

Additionally, disclosed herein are devices including the disclosed NIR II dyes. In one aspect, the device can be a night vision sensor, a solar cell, an organic light emitting diode (OLED) display, or any combination thereof.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: General Methods

All chemicals and solvents were purchased from commercial suppliers and used without further purification unless other-wise specified. $^1$H NMR (500 MHz) and $^{13}$C NMR (500 MHz) spectra were recorded in deuterated solvents on a Bruker ADVANCE 500 NMR Spectrometer. J values are expressed in Hz and quoted chemical shifts are in ppm downfield from tetramethylsilane (TMS) reference using the residual protonated solvents as an internal standard. The signals have been designated as follows: s (singlet), d (doublet), t (triplet), m (multiplets). High resolution mass spectra (HRMS) were deter-mined on Bruker-micrO-TOF-Q II Mass Spectrometer. Absorption spectra were acquired using a Cary 5000 UV-Vis-NIR spectrophotometer in a 1 cm quartz cell. Fluorescence spectra were acquired using a Horiba QuantaMaster 8075-21 spectrofluorometer with xenon lamp excitation and liquid nitrogen cooled indium gallium arsenide solid state detector. 882 nm excitation was chosen to coincide with a Xe emission peak. The relative quantum yield of the rhodindolizine dye was calculated using a known technique. A cyanine dye was chosen as the standard due to the similar absorption and emissive regions. The dye, C5, has a known quantum yield of 2.2%. The absorbance point for the quantum yield was chosen because of similar overlap in the absorption spectra between the standard and the rhodindolizine dye. An excitation wavelength of 870 nm was used for both the C5 and rhodindolizine dyes. Both samples were dissolved in DCM to a 10 µM concentration.

Example 2: Synthesis and Characterization 3-oxo-3H-spiro[isobenzofuran-1,9'-xanthene]-3',6'-diyl-bis(trifluoromethanesulfonate) (1) and 3',6'-dibromofluoran (3) were prepared according to literature procedures.

Representative Procedure for the Preparation of RhIndz (2a)

Compound 1 (50 mg, 0.083 mmol), 1-methyl-2-phenylindolizine (35 mg, 0.167 mmol), solvent (0.34-2.0 mL), catalyst (5-10 mol %), base, and additives (pivalic acid) were placed in a microwave sealed tube, flushed with nitrogen and heated for 12-24 h at 80-150° C. according to Table 1 below.

TABLE 1

Optimization of Reaction Conditions for Xanthene Ditriflate

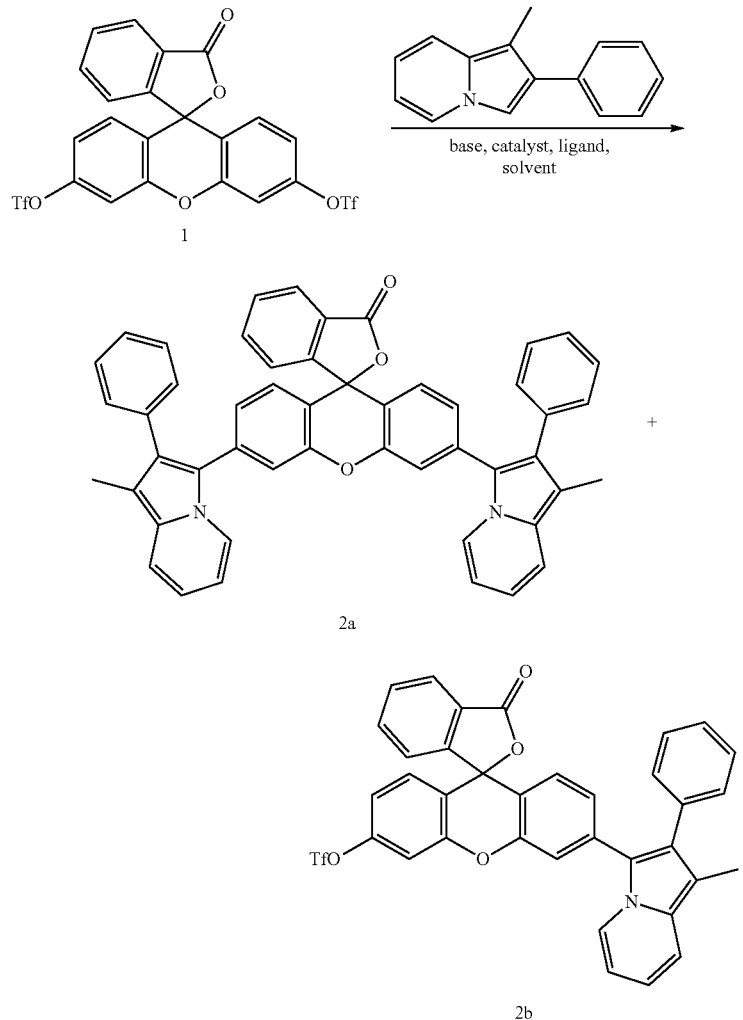

| Entry | Catalyst | Ligand | KOAc (equiv.) | Temperature (° C.) | Time (h) | (%)$^a$ 2a:2b |
|---|---|---|---|---|---|---|
| 1 | PdCl$_2$(PPh$_3$)$_2$ | None | 5.2 | 80 | 6.5 | 5:10 |
| 2 | PdCl$_2$(PPh$_3$)$_2$ | None | 6.2 | 80 | 18 | 8:17 |
| 3 | Pd(OAc)$_2$ | PPh$_3$ | 3.0 | 150 | 20 | 14:0 |
| 4 | Pd(OAc)$_2$ | XPhos | 6.0 | 100 | 20 | 22:20 |
| 5$^b$ | Pd(OAc)$_2$ | XPhos | 6.0 | 100 | 20 | 5:6 |

$^a$Isolated yields (%) were reported for 2a and 2b.
$^b$Pivalic acid added (30 mol %).

Reactions shown in Table 1 were carried out in a sealed tube under nitrogen atmosphere in the presence of 1 (0.083 mmol), 1-methyl-2-phenylindolizine (0.167 mmol), NMP (entries 1 and 2) or DMF as solvent (0.34-2.0 mL), catalyst (10 mol %), ligand (20 mol % when added), and KOAc.

The reactions were monitored by TLC and NMR. Once it was determined that the reaction conversion has plateaued, the crude was diluted with 30 mL of dichloromethane and washed with water (5×10 mL). The crude product was dried over anhydrous sodium sulfate, filtered, and concentrated under reduced pressure.

3',6'-bis(1-methyl-2-phenylindolizin-3-yl)-3H-spiro [2-benzofuran-1,9'-xanthen]-3-one (2a)

The crude product was purified by column chromatography on silica gel (hexane:ethyl acetate, 70:30) to give the product (2a) as a light-yellow solid in 20% yield (12 mg). $^1$H NMR (500 MHz, CD$_2$Cl$_2$) δ 8.11 (d, J=7.2 Hz, 2H), 8.00 (d, J=7.6 Hz, 1H), 7.73 (td, J=7.6, 1.1 Hz, 1H), 7.68-7.63 (m, 1H), 7.40 (d, J=9.0 Hz, 2H), 7.33-7.20 (m, 13H), 6.97 (dd, J=8.2, 1.7 Hz, 2H), 6.78 (d, J=8.2 Hz, 2H), 6.73-6.68 (m, 2H), 6.46 (t, J=6.7 Hz, 2H), 2.31 (d, J=4.5 Hz, 6H). $^{13}$C{1H}NMR (126 MHz, CD$_2$Cl$_2$) δ 169.6, 153.3, 152.0, 135.82, 135.79, 135.1, 131.4, 131.2, 130.6, 129.3, 128.8, 128.6, 127.1, 126.9, 126.3, 126.2, 125.6, 124.6, 124.5, 124.3, 122.5, 120.4, 119.6, 118.7, 118.1, 117.9, 117.7, 117.2, 111.2, 108.2, 82.8, 9.5. HRMS-ESI-TOF (m/z): [M+H]$^+$ calcd for $C_{50}H_{34}N_2O_3H$, 711.2642, found 711.2642.

3'-(1-methyl-2-phenylindolizin-3-yl)-3-oxo-3H-spiro[2-benzofuran-1,9'-xanthen]-6'-yl trifluoromethanesulfonate (2b)

The crude product was purified by column chromatography on silica gel (hexane:ethyl acetate, 70:30) to give the product (2b) as a light yellow solid in 22% yield (12 mg). $^1$H NMR (500 MHz, $CD_2Cl_2$) δ 8.14 (s, 1H), 8.03 (d, J=6.6 Hz, 1H), 7.73 (s, 1H), 7.68 (d, J=7.0 Hz, 1H), 7.54 (s, 1H), 7.41 (d, J=7.7 Hz, 1H), 7.28 (d, J=36.9 Hz, 8H), 7.00 (d, J=7.4 Hz, 1H), 6.90 (d, J=22.3 Hz, 1H), 6.81 (d, J=8.0 Hz, 1H), 6.71 (s, 1H), 6.47 (s, 1H), 2.32 (s, 3H). $^{13}C\{1H\}$ NMR (126 MHz, $CD_2Cl_2$) δ 169.4, 153.2, 152.8, 152.3, 151.9, 135.86, 135.85, 135.8, 135.14, 135.12, 131.47 131.45, 131.2, 130.6, 129.5, 129.3, 128.8, 128.7, 126.9, 126.4, 125.6, 124.6, 122.5, 120.3, 118.8, 118.2, 118.1, 117.9, 117.2, 111.3, 111.0, 108.2, 82.4, 9.5. HRMS-ESI-TOF (m/z): [M+K]$^+$ calcd for $C_{36}H_{22}F_3NO_6SK$ 692.0752, found 692.0751.

Preparation RhIndz and Phenyl-Substituted RhIndz

Optimization of preparation of RhIndz is provided in Tables 2 and 3 below.

TABLE 2

Optimization of Reaction Conditions with 3',6'-dibromofluoran (3)

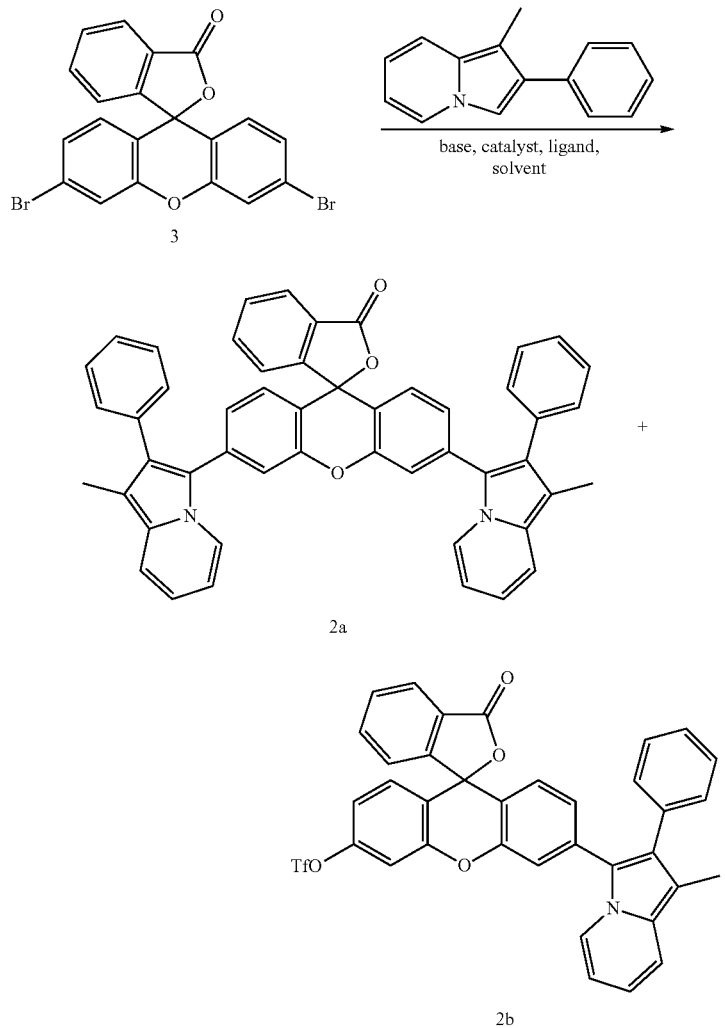

| Entry | Catalyst | Base (equiv.) | Temperature (° C.) | Time (h) | Yield (%)$^a$ |
|---|---|---|---|---|---|
| 1 | PdCl$_2$(PPh$_3$)$_2$ | KOAc (5.2) | 80 | 18 | 23 |
| 2 | PdCl$_2$(PPh$_3$)$_2$ | Cs$_2$CO$_3$ (5.2) | 80 | 18 | 23 |
| 3 | PdCl$_2$(PPh$_3$)$_2$ | KOAc (5.2) | 110 | 24 | 35 |
| 4 | PdCl$_2$(PPh$_3$)$_2$ | KOAc (5.2) | 150 | 24 | 35 |

$^a$Isolated yields (%) reported for 2a.

Unless otherwise specified, the reaction was carried out in a sealed tube under nitrogen atmosphere in the presence of 3 (0.11 mmol), 1-methyl-2-phenylindolizine (0.24 mmol), NMP solvent (0.34-2 mL), PdCl$_2$(PPh$_3$)$_2$ (10 mol %), and base, for 18-24 h at 80° C.-150° C.

TABLE 3

Substrate Scope with Substituted Indolizines di-substitued Prod mono-substituted Prod

| Compound | R Group | Yield (%) di:mono |
|---|---|---|
| CNRhIndz 4 | 4-CNPh | 30:14 |
| CF$_3$RhIndz 5 | 4-CF$_3$Ph | 11:6 |
| NO$_2$RhIndz 6 | 4-NO$_2$Ph | Trace |
| diCF$_3$RHIndz 7 | 3,5-bisCF$_3$Ph | Trace |
| HORhIndz 8 | 4-OHPh | Trace |
| MeORhIndz 9 | 4-OMePh | 20:0 |

One exemplary reaction was carried out in a sealed tube under nitrogen atmosphere in the presence of 3',6'-dibromofluoran (3) (0.458 g, 1 mmol), 1-methyl-2-phenylindolizine (0.456 g, 2.2 mmol), solvent (3 mL), catalyst 10 mol %), base, and additives (Piv-OH) for 18-24 h at 110° C. The reactions were monitored by TLC and $^1$H NMR. Once it was determined that the reaction conversion has plateaued, the crude was diluted with 30 mL of dichloromethane and washed with water (5×10 mL). The crude product was dried over anhydrous sodium sulfate, filtered, and concentrated under reduced pressure. The crude product was purified by column chromatography on silica gel (hexane:ethyl acetate, 70:30) to give the product (2a) as a light-yellow solid in 35% yield (244 mg).

4-(3'-{3'-[2-(4-cyanophenyl)-1-methylindolizin-3-yl]-3-oxo-3H-spiro[2-benzofuran-1,9'-xanthen]-6'-yl}-1-methylindolizin-2-yl)benzonitrile (4a)

Yellow solid, 30% yield, (25 mg). $^1$H NMR (500 MHz, CD$_2$Cl$_2$) δ 8.09 (d, J=7.1 Hz, 2H), 8.03 (d, J=7.6 Hz, 1H), 7.77 (t, J=7.5 Hz, 1H), 7.68 (t, J=7.5 Hz, 1H), 7.59 (d, J=8.1 Hz, 4H), 7.42 (d, J=9.0 Hz, 2H), 7.33 (d, J=8.0 Hz, 4H), 7.28 (d, J=7.7 Hz, 1H), 7.22 (s, 2H), 6.93 (d, J=8.2 Hz, 2H), 6.82 (d, J=8.2 Hz, 2H), 6.76-6.71 (m, 2H), 6.50 (t, J=6.8 Hz, 2H), 2.32 (s, 6H). $^{13}$C{1H} NMR (126 MHz, CD$_2$Cl$_2$) δ 169.5, 153.2, 152.0, 141.1, 135.9, 134.5, 132.5, 131.8, 131.7, 130.7, 129.2, 127.3, 127.0, 126.5, 125.7, 124.5, 122.5, 120.6, 119.6, 118.9, 118.4, 118.3, 117.7, 111.9, 110.5, 108.1, 82.5, 9.5. HRMS-ESI-TOF (m/z): [M+K]$^+$ calcd for C$_{52}$H$_{32}$N$_4$O$_3$K, 799.2106, found 799.2106.

3'-(2-(4-cyanophenyl)-1-methylindolizin-3-yl)-3-oxo-3H-spiro[2-benzofuran-1,9'-xanthen]-6'-yltrifluormethanesufonate (4b)

Yellow solid, 14% yield, (9 mg). $^1$H NMR (300 MHz, CD$_2$Cl$_2$) δ 8.11 (d, J=7.2 Hz, 1H), 8.04 (d, J=7.4 Hz, 1H), 7.79-7.72 (m, 1H), 7.72-7.65 (m, 1H), 7.61 (s, 1H), 7.59 (s, 1H), 7.57-7.54 (m, 1H), 7.43 (d, J=9.0 Hz, 1H), 7.38-7.30 (m, 3H), 7.26 (d, J=5.6 Hz, 2H), 7.00-6.91 (m, 2H), 6.85 (d, J=8.2 Hz, 1H), 6.74 (dd, J=8.7, 6.5 Hz, 1H), 6.50 (t, J=6.8 Hz, 1H), 2.33 (d, J=2.8 Hz, 3H). $^{13}$C{1H} NMR (126 MHz, CD$_2$Cl$_2$) δ 169.6, 153.4, 152.1, 152.0, 142.8, 141.1, 135.9, 134.4, 132.5, 131.8, 131.8, 130.7, 129.21, 129.16, 127.3, 126.8, 126.4, 125.7, 124.5, 123.3, 122.5, 120.7, 119.6, 119.3, 119.0, 118.4, 118.3, 117.7, 116.2, 111.9, 110.5, 108.1, 82.4, 9.6. HRMS-ESI-TOF (m/z): [M+K]$^+$ calcd for C$_{36}$H$_{21}$BrN$_2$O$_3$K, 609.0808, found 609.0877.

3',6'-bis(2-(3,5-bis(trifluoromethyl)phenyl)-1-methylindolizin-3-yl)-3H-spiro[2-benzofuran-1,9'-xanthen]-3-one (5a)

Brown solid, 11% yield (10 mg). $^1$H NMR (300 MHz, CD$_2$Cl$_2$) δ 8.09 (d, J=7.2 Hz, 2H), 8.02 (d, J=7.5 Hz, 1H), 7.78-7.72 (m, 1H), 7.70-7.64 (m, 1H), 7.57 (d, J=8.1 Hz, 4H), 7.42 (d, J=9.0 Hz, 2H), 7.36 (d, J=8.0 Hz, 4H), 7.29 (d, J=7.6 Hz, 1H), 7.23 (d, J=1.5 Hz, 2H), 6.96 (dd, J=8.2, 1.6 Hz, 2H), 6.82 (d, J=8.2 Hz, 2H), 6.73 (dd, J=8.9, 6.5 Hz, 2H), 6.52-6.45 (m, 2H), 2.32 (s, 6H). $^{13}$C{1H} NMR (126 MHz, CD$_2$Cl$_2$) δ 169.5, 153.2, 152.1, 140.0, 135.9, 134.7, 131.6, 131.5, 130.7, 129.1, 128.8, 128.5, 127.6, 127.0, 126.4, 126.2, 125.7, 125.6, 125.5, 124.6, 124.0, 122.5, 120.6, 118.9, 118.3, 118.2, 117.6, 111.7, 108.2, 82.6, 9.5. HRMS-ESI-TOF (m/z): [M+H]$^+$ calcd for C$_{52}$H$_{32}$F$_6$N$_2$O$_3$H, 847.2389, found 847.2389.

3'-(1-methyl-2-(4-(trifluoromethyl)phenyl)indolizin-3-yl)-3-oxo-3H-spiro[2-benzofuran-1,9'-xanthen]-6'-yltrifluoromethanesulfonate (5b)

Brown solid, 6% yield (5 mg). $^1$H NMR (300 MHz, CD$_2$Cl$_2$) δ 8.11 (d, J=7.2 Hz, 1H), 8.04 (d, J=7.3 Hz, 1H), 7.71 (dt, J=20.2, 7.2 Hz, 2H), 7.62-7.51 (m, 3H), 7.47-7.23 (m, 6H), 6.99 (d, J=8.1 Hz, 1H), 6.93 (d, J=8.1 Hz, 1H), 6.85 (d, J=8.2 Hz, 1H), 6.78-6.69 (m, 1H), 6.49 (t, J=6.7 Hz, 1H), 2.33 (s, 3H). $^{13}$C{1H} NMR (126 MHz, CD$_2$Cl$_2$) δ 169.6, 153.4, 152.11, 152.06, 142.8, 140.0, 135.9, 134.7, 131.6, 131.5, 130.7, 129.2, 129.1, 128.5, 127.6, 126.9, 126.4, 125.7, 125.57, 125.55, 124.5, 123.2, 122.5, 120.6, 119.3, 119.0, 118.3, 118.2, 117.5, 116.2, 111.7, 108.2, 82.4, 9.6. HRMS-ESI-TOF (m/z): [M+K]$^+$ calcd for C$_{36}$H$_{21}$BrF$_3$NO$_3$K, 690.0288, found 690.0284.

3',6'-bis(2-(4-methoxyphenyl)-1-methylindolizin-3-yl)-3H-spiro[2-benzofuran-1,9'-xanthen]-3-one (9a)

Pale green solid, 20% yield (17 mg). $^1$H NMR (500 MHz, CD$_2$Cl$_2$) δ 8.11 (d, J=7.1 Hz, 2H), 8.01 (d, J=7.6 Hz, 1H), 7.74 (t, J=7.4 Hz, 1H), 7.66 (t, J=7.3 Hz, 1H), 7.39 (d, J=8.9 Hz, 2H), 7.31-7.23 (m, 3H), 7.13 (t, J=9.3 Hz, 4H), 6.96 (d, J=8.2 Hz, 2H), 6.85 (d, J=7.1 Hz, 4H), 6.78 (d, J=8.1 Hz, 2H), 6.68 (dd, J=15.7, 7.7 Hz, 2H), 6.44 (t, J=6.7 Hz, 2H), 3.79 (s, 6H), 2.29 (s, 6H). $^{13}$C NMR (126 MHz, CD$_2$Cl$_2$) δ 169.6, 158.9, 153.3, 152.0, 135.8, 135.3, 132.2, 131.5, 130.6, 128.9, 128.8, 127.9, 127.1, 126.3, 125.6, 124.6, 122.4, 120.3, 118.7, 118.0, 117.8, 117.1, 114.1, 111.1, 108.2, 82.8, 55.7, 9.5. HRMS-ESI-TOF (m/z): [M+K]$^+$ calcd for C$_{52}$H$_{38}$N$_2$O$_5$K, 809.2412, found 809.2411.

(Z)-3-(9-(2-(ethoxycarbonyl)phenyl)-6-(1-methyl-2-phenylindolizin-3-yl)-3H-xanthen-3-ylidene)-1-methyl-2-phenyl-3H-indolizin-4-ium (10)

Compound 2a (80 mg, 0.112 mmol) was transferred to a 150 mL two neck round bottom flask and flushed with nitrogen thoroughly for 10 minutes. 1,2-Dichloroethane (4.8 mL) and POCl$_3$ (0.03 mL) were added to the flask and the reaction was refluxed for 4 h. The reaction mixture was allowed to cool to room temperature and concentrated under reduced pressure to give a green solid, which was used in the next step without further purification. The reaction mixture was thoroughly flushed with nitrogen for 10 min, followed by the addition of dry ethanol (3.0 mL), and stirring at 50° C. for 24 h. The reaction mixture was concentrated under reduced pressure and the solid was dissolved in chloroform (20 mL). The organic layer was washed with water (8×10 mL), dried over anhydrous sodium sulfate, filtered, and concentrated under reduced pressure to give a green solid. The solid was then washed with hot hexane (20×5 mL), and recrystallized from hexane:ethyl acetate mixture to give 28 mg of a green solid in 34% yield. $^1$H NMR (500 MHz, CD$_2$Cl$_2$) δ 8.32 (s, 1H), 8.11 (d, J=5.9 Hz, 1H), 8.01 (d, 1H), 7.79 (s, 2H), 7.73 (s, 1H), 7.66 (t, 1H), 7.57 (s, 1H), 7.41 (s, 4H), 7.27 (dd, J=29.1, 13.4 Hz, 10H), 6.93 (d, J=26.1 Hz, 2H), 6.83 (d, J=6.4 Hz, 1H), 6.78 (d, J=7.4 Hz, 1H), 6.70 (t, 1H), 6.46 (t, 1H), 4.09 (q, 2H), 2.35-2.23 (m, 6H), 1.31 (t, 3H). $^{13}$C{1H} NMR (126 MHz, CDCl$_3$) δ 165.4, 161.2, 157.1, 142.7, 137.5, 135.3, 134.7, 134.6, 134.4, 133.9, 133.3, 131.3, 131.2, 131.1, 130.9, 130.8, 130.7, 130.2, 129.3, 129.1, 129.0, 128.8, 128.5, 128.4, 127.8, 126.6, 126.0, 125.4, 124.9, 124.0, 122.2, 122.14, 122.09, 118.34, 118.30, 117.9, 117.4, 116.9, 115.1, 114.3, 113.1, 111.0, 107.9, 61.9, 22.9, 14.3, 9.4. HRMS-ESI-TOF (m/z): [M]$^+$ calcd for C$_{52}$H$_{39}$N$_2$O$_3$$^+$ 739.2955, found 739.2924.

Example 3: Further Optimization of Reaction Conditions

The synthesis of RhIndz begins with the known 3,6-ditriflated fluorescein (1) reported in the literature. The intermolecular C—H bond functionalization of 1-methyl-2-phenylindolizine with the 3,6-ditriflated xanthene derivative was explored by varying the catalyst, ligand, base, additive, solvent, temperature and time according to Table 1 and Table 4 below.

TABLE 4

Further Optimization of 2a from Xanthene Ditriflate

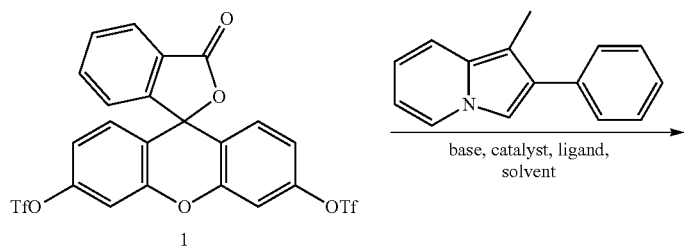 [SMILES: O=C1OC2(c3ccc(OS(=O)(=O)C(F)(F)F)cc3Oc3cc(OS(=O)(=O)C(F)(F)F)ccc32)c2ccccc21 ; Cc1c(-c2ccccc2)cn2ccccc12]

1

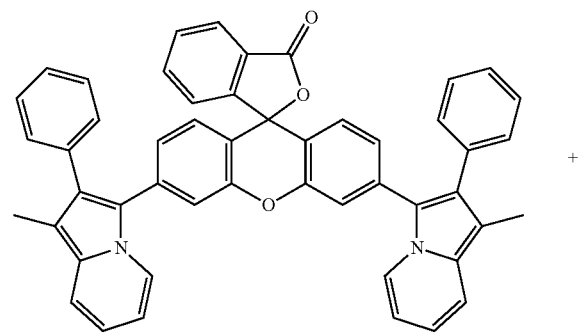

2a

TABLE 4-continued

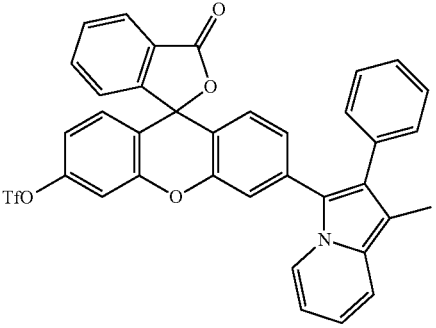

2b

| Entry | Catalyst (equiv) | Ligand (equiv) | Base (equiv) | Additive (equiv) | Solvent | Temp. (° C.) | Time (h) | (%) 2a:2b |
|---|---|---|---|---|---|---|---|---|
| 1 | PdCl$_2$(PPh$_3$)$_2$ (0.1) | None | Cs$_2$CO$_3$ (3.0) | None | NMP | 80 | 18 | <5 |
| 2 | PdCl$_2$(PPh$_3$)$_2$ (0.1) | None | KO$^t$Bu (3.0) | None | NMP | 80 | 18 | 0 |
| 3 | PdCl$_2$(PPh$_3$)$_2$ (0.1) | None | NaO$^t$Bu (3.0) | None | NMP | 80 | 18 | 0 |
| 4 | Pd(OAc)$_2$ (0.1) | ($^t$Bu)$_2$PMeHBF$_4$ (0.2) | K$_2$CO$_3$ (6.0) | PivOH (0.3) | DMA | 100 | 20 | 0 |
| 5 | Pd(OAc)$_2$ (0.1) | XPhos (0.2) | K$_2$CO$_3$ (6.0) | PivOH (0.3) | DMA | 100 | 20 | 0 |
| 6 | Pd(OAc)$_2$ (0.05) | BINAP (0.075) | Cs$_2$CO$_3$ (3.0) | None | Toluene | 100 | 20 | Trace |
| 7 | Pd(OAc)$_2$ (0.05) | BINAP (0.075) | Cs$_2$CO$_3$ (3.0) | PivOH (0.3) | Toluene | 100 | 20 | Trace |
| 8 | Pd(OAc)$_2$ (0.05) | BINAP (0.075) | Cs$_2$CO$_3$ (3.0) | None | THF | 100 | 20 | Trace |
| 9 | Pd(OAc)$_2$ (0.05) | BINAP (0.075) | Cs$_2$CO$_3$ (3.0) | None | Dioxane | 100 | 20 | Trace |
| 10 | Pd(dba)$_3$·CHCl$_3$ adduct (0.1) | XPhos (0.2) | Cs$_2$CO$_3$ (3.0) | PivOH (0.3) | THF | 100 | 24 | 0 |

For data in Table 4, unless otherwise specified, the reaction was carried out in a sealed tube under nitrogen atmosphere in the presence of 1 (0.083 mmol) and 1-methyl-2-phenylindolizine (0.167 mmol), solvent (0.34-2.0 mL), catalyst (5-10 mol %), base, and additives (pivalic acid) for 12-24 h at 80-150° C. Isolated yields (%) were reported for 2a and 2b.

PdCl$_2$(PPh$_3$)$_2$ (10 mol %) was used as the initial catalyst, potassium acetate (KOAc) (5.2 equiv.) as the base, and N-methyl-2-pyrrolidone (NMP) as the solvent at 80° C. for 6.5 h (Table 1, Entry 1). For these conditions, 5% of the desired disubstituted product (2a) and 10% of undesired monosubstituted product (2b) were isolated. Increasing the time to 17 h only slightly increased the yield of the desired product (Table 1, Entry 2). Changing the base to cesium carbonate (Cs$_2$CO$_3$), potassium tert-butoxide (KO$^t$Bu), or sodium tert-butoxide (NaO$^t$Bu) yielded trace or no product (Table 4, Entries 1-3). In fact, the ditriflated xanthene precursor was converted to fluorescein by a previously observed de-triflation process, with the recovery of the indolizine starting material. When the catalyst was changed to Pd(OAc)$_2$ (10 mol %) with triphenylphosphine (PPh$_3$) (20 mol %) as the ligand, KOAc (3 equiv) as the base in DMF at 150° C. for 18 h-20 h, only the desired product 2a was obtained in 14% isolated yield (Table 1, Entry 3). The yield of the desired product increased to 22% when XPhos (20 mol %) was used as the ligand in place of PPh$_3$ at 100° C. (Table 1, Entry 4). Direct arylation of electron rich indolizines with trialkylphosphines has been shown; however, with ($^t$Bu)$_2$PMeHBF$_4$ added as the ligand, no product was obtained (Table 4, Entry 4). In fact, the addition of pivalic acid (30 mol %) or any condition that requires strong bases such as K$_2$CO$_3$, Cs$_2$CO$_3$, and KOtBu, including reported conditions that use Pd(dba)$_3$·CHCl$_3$ adduct (10 mol %) as the catalyst, resulted in only trace or no product at all (Table 4, Entries 5-10). In all cases, mostly unreacted starting materials were recovered.

While the target dye is accessible from the xanthene ditriflate precursor with yields high enough for photophysical studies, the C—H bond functionalization of 1-methyl-2-phenylindolizine with 3',6'-dibromofluoran was investigated to determine if the reaction yield could be improved (Table 2). Beginning with one of the highest yielding conditions from the ditriflate study in Table 1, 3',6'-dibromofluoran (3) and 1-methyl-2-phenylindolizine were subjected to PdCl$_2$(PPh$_3$)$_2$ (10 mol %) as the catalyst, KOAc (5.2 equiv) as the base, and NMP as the solvent at 80° C. for 18 h. From these reaction conditions, the desired product was isolated in 23% yield (Table 2, Entry 1). Changing the base to Cs$_2$CO$_3$ did not affect the yield (Table 2, Entry 2), and there was no observable conversion with NaO$^t$Bu (Table 5, Entry 1).

TABLE 5

Further Optimization of 2a from 3',6'-dibromofluoran (3)

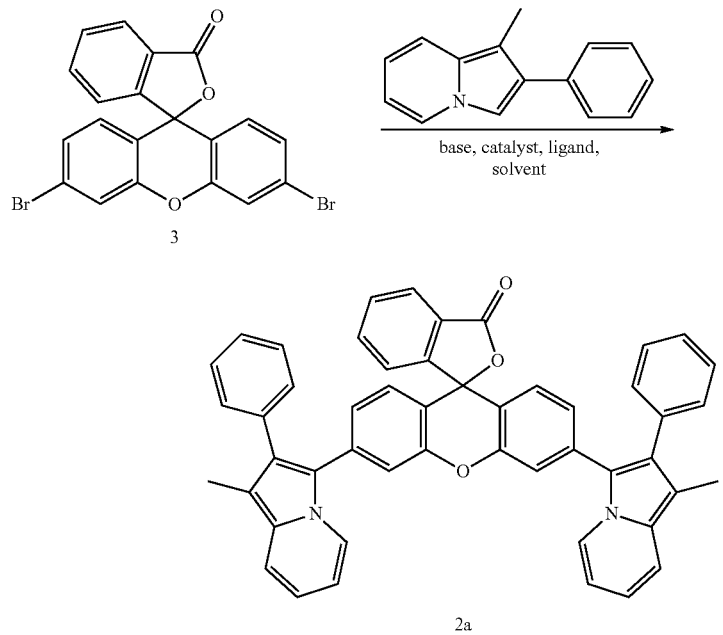

| Entry | Catalyst (equiv) | Ligand (equiv) | Base (equiv) | Additive (equiv) | Solvent | Temp. (° C.) | Time (h) | Yield (%) |
|---|---|---|---|---|---|---|---|---|
| 1 | PdCl$_2$(PPh$_3$)$_2$ (0.1) | None | NaO$^t$Bu (5.2) | None | NMP | 80 | 18 | 0 |
| 2 | Pd(OAC)$_2$ (0.05) | ($^t$Bu)$_2$PMeHBF$_4$ (0.1) | K$_2$CO$_3$ (1.5) | PivOH (0.3) | DMA | 100 | 18 | 0 |
| 3 | Pd(OAc)$_2$ (0.1) | XPhos (0.2) | KOAc (3.0) | None | DMF | 100 | 18 | trace |

Unless otherwise specified, the reaction was carried out in a sealed tube under nitrogen atmosphere in the presence of 3 (0.11 mmol) and 1-methyl-2-phenylindolizine (0.24 mmol), solvent (0.34-2 mL), catalyst (5-10 mol %), base, and additives (PivOH) for 18-24 h at 80-150° C. Isolated yields (%) were reported for 2a.

By increasing the reaction temperature and time to 110° C. and 24 h, respectively, the desired product could be isolated in 35% yield (Table 2, Entry 3). Further increase in the temperature to 150° C. did not improve the yield (Table 2, Entry 4). Again, Fagnou's conditions or the use of XPhos only lowered the percent conversion after 18 h (Table 5, Entries 2 and 3). This work the first known case of a xanthene-based C(sp$^2$)-C(sp$^2$) bond C—H activation cross-coupling reaction, and this route sets a precedent for the rapid access of aryl-xanthene derivatives.

In order to probe the substrate scope with respect to the C—H bond functionalization of the indolizine coupling partner, the electronic effects on the reaction were investigated. As such, the C—H bond functionalization of six phenyl-substituted 1-methyl-2-phenylindolizine containing electron donating and withdrawing groups were investigated in comparison with the parent 1-methyl-2-phenylindolizine using the optimized conditions from Table 3. 4-Cyanophenyl-substituted rhodindolizine (CNRhIndz) was obtained in comparative yield relative to RhIndz (30% versus 35%, respectively) indicating that the resonance withdrawing CN group is tolerated in this reaction. However, 4-trifluoromethylphenyl-substituted (CF$_3$RhIndz), 4-nitrophenyl-substituted rhodindolizine (NO$_2$RhIndz) and 3,5-ditrifluoromethylphenyl-substituted (diCF$_3$RhIndz), led to low or trace amounts of the corresponding products. The origin of the low yields is not obvious, but it is notable that the starting materials, compound 3 and indolizine precursors were not consumed during the reaction. Modifying the phenyl group with the electron donating phenol substituent led to only trace product, presumably due to the reaction not tolerating acidic functionality (Table 3, Entry 5). On the other hand, the methoxy derivative gave a reasonable yield (20%) of the desired product (Table 3, Entry 6).

With RhIndz in hand, the reactivity of the spirolactone functionality was explored. Upon exposure to strong Bronsted acids, the lactone ring resisted ring opening. However, the ring opened acid chloride derivative could be prepared directly from the lactone using POCl$_3$ in refluxing 1,2-dichloroethane (Scheme 1), which was reacted with anhydrous ethanol to form the ethyl ester (10).

Scheme 1

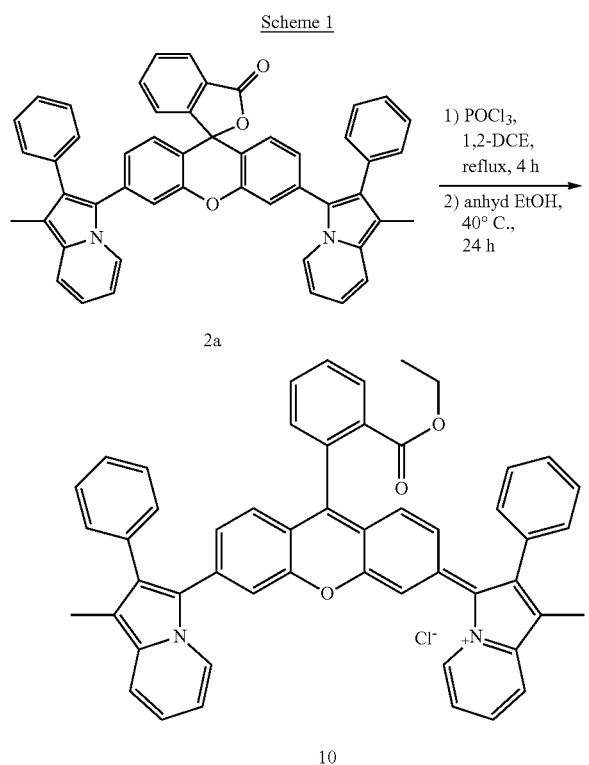

Example 4: Photophysical Properties

Having accessed both the ring closed (2a) and ring open (10) forms, the photophysical properties of these derivatives were investigated.

Figure 2:
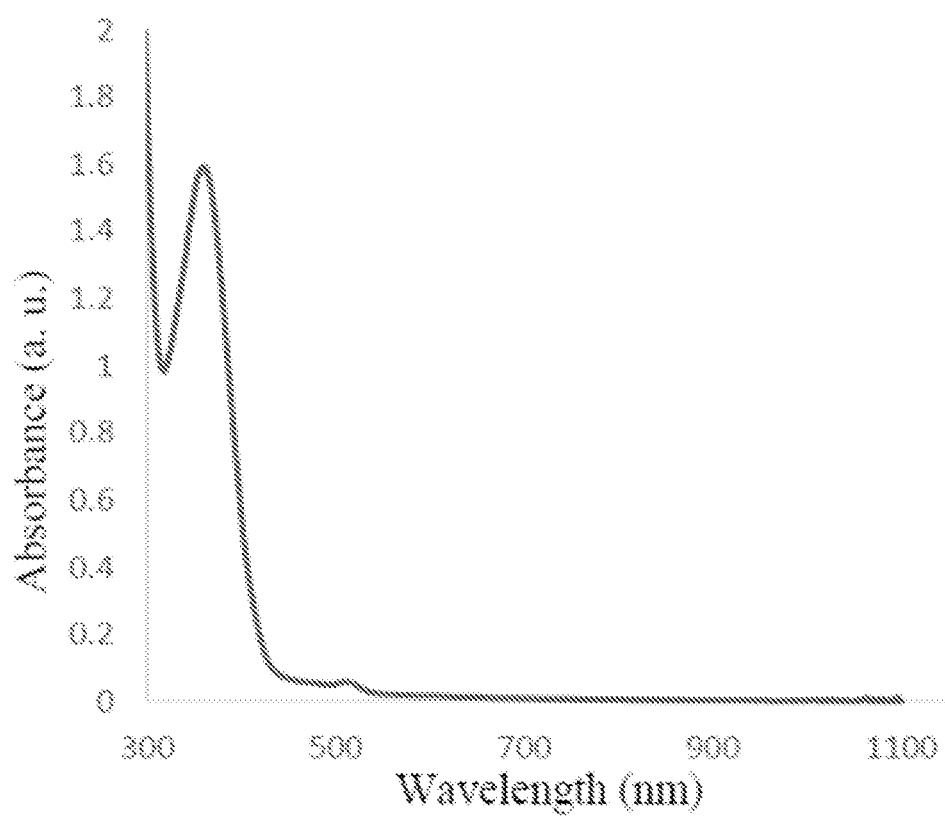
FIG. 2 shows the UV absorption spectrum of RhIndz lactone (compound 2a).

The absorption maximum for RhIndz is 375 nm (FIG. 2). However, upon the formation of the ethyl ester, a large bathochromic shift of 550 nm occurs shifting the maximum absorption to 920 nm, which is within the NIR II region. The dye also displays a high molar absorptivity of 97,500 $M^{-1}cm^{-1}$, which is conducive to achieving a practical molecular brightness (MB). Dye 10 also exhibits an emission peak at ~1092 nm in the NIR II region, which represents an almost 200 nm Stokes shift (FIG. 1). This observed emission is broad extending from 950 nm to just beyond 1400 nm in dichloromethane with a quantum yield (φ) of ~0.03% when using a cyanine reference dye (C5). While this φ appears low, it is stressed that very few molecular emissive materials exist in this region.

Additionally, a range of solvent polarities were evaluated to access the polarity of RhIndz in the ground-state via absorption spectroscopy and in the excited-state via fluorescence spectroscopy (Table 6).

TABLE 6

Solvent Effects on the Photophysical Properties of RhIndz Ethyl Ester (10)

| Solvent | Dielectric Constant | Dipole (D) | Abs Max (nm) | Abs Max (eV) | Emission Max (nm) | Emission Max (eV) |
|---|---|---|---|---|---|---|
| Acetone | 21 | 2.88 | 893 | 1.388 | *** | *** |
| Chloroform | 4.8 | 1.04 | 925 | 1.340 | 1051 | 1.179 |
| DCM | 9.1 | 1.60 | 921 | 1.346 | 1086 | 1.142 |
| DMF | 38 | 3.82 | 912 | 1.359 | 1041 | 1.191 |
| DMSO | 46.7 | 3.96 | 901 | 1.376 | 1075 | 1.153 |
| Ethyl Acetate | 6.0 | 1.78 | 896 | 1.384 | *** | *** |
| Ethanol | 24.6 | 1.69 | 908 | 1.365 | 1071 | 1.158 |
| Methanol | 33 | 1.70 | 900 | 1.378 | 1073 | 1.155 |
| THF | 7.5 | 1.75 | 903 | 1.373 | 1014 | 1.223 |
| Toluene | 2.4 | 0.36 | 917 | 1.352 | 1057 | 1.173 |

***No appreciable emission in these solvents.

Both the absorption and emission maxima varied by <0.04 eV in energy for solvents ranging in dipole from 3.96 debye to 0.36 debye and with dielectric constants ranging from 46.7 to 3.96. These very large ranges of solvent properties show very small changes in the absorption maxima, which indicates minimal conformational or localized charge density changes occurring in the ground or excited state of 10 due to the solvent properties.

In conclusion, the use of C—H bond functionalization reaction to prepare NIR II emissive dyes by the combination of the electron rich indolizine donor with the electron poor xanthene core has been demonstrated. The best condition found was $PdCl_2(PPh_3)_2$ catalyst with KOAc base and NMP as solvent at 110° C. CNRhIndz and MeORhIndz were also prepared by the C-bond activation reaction; while using similar conditions to produce $CF_3RhIndz$, $(diCF_3)RhIndz$ and OHRhIndz only yielded trace amounts of the product, with recovery of the starting materials. The RhIndz dye, while not a typical rhodamine structure with N-xanthene bonds, was non-fluorescent in the closed spirocyclic structure; however, with the formation of the opened ethyl ester derivative, the fluorophore possessed absorption and emission within the NIR II region with high molar absorptivity and a φ of ~0.03%. This is the first xanthene-based emissive dye with photophysical properties in the NIR II region.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

ASPECTS

The present disclosure can be described in accordance with the following numbered aspects, which should not be confused with the claims.

Aspect 1. A near infrared II (NIR II) dye comprising a structure of Formula I,

Formula I

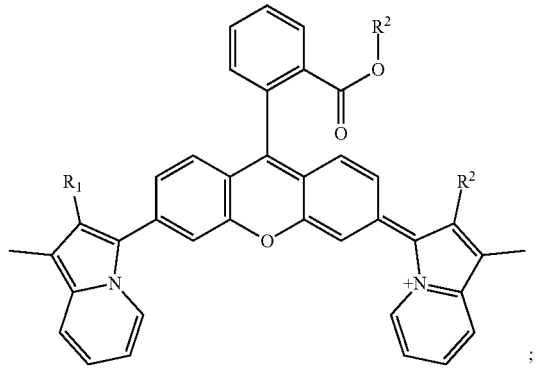

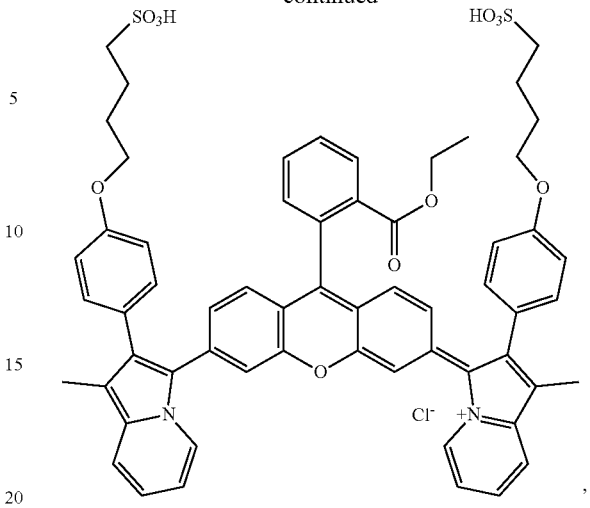

or any combination thereof.

wherein R¹ comprises a substituted or unsubstituted C1-C10 linear or branched alkyl group, a substituted or unsubstituted C1-C10 linear or branched alkoxy group, a C3-C10 cycloalkyl group, a substituted or unsubstituted aryl or heteroaryl group, or any combination thereof; and wherein R² comprises a C1-C10 linear or branched alkyl group, a C3-C10 cycloalkyl group, or any combination thereof.

Aspect 2. The NIR II dye of aspect 1, wherein R¹ is selected from phenyl, 4-cyano phenyl, 4-trifluoromethylphenyl, 4-nitrophenyl, 3,5-bis-trifluoromethylphenyl, 4-hydroxyphenyl, 4-methoxyphenyl, -Ph-4-O(CH₂)₄SO₃H, or any combination thereof.

Aspect 3. The NIR II dye of aspect 1 or 2, wherein the NIR II dye is selected from

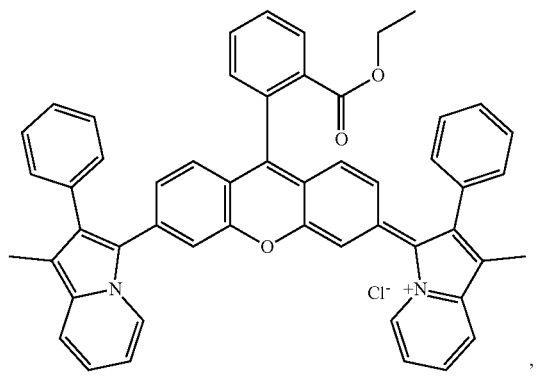

Aspect 4. The NIR II dye of any one of aspects 1-3, wherein the NIR II dye is soluble in at least one solvent.

Aspect 5. The NIR II dye of aspect 4, wherein the solvent comprises water, acetone, chloroform, dichloromethane, dimethylformamide, DMSO, ethyl acetate, ethanol, methanol, tetrahydrofuran, toluene, or any combination thereof.

Aspect 6. The NIR II dye of aspect 4 or 5, wherein the NIR II dye has a dielectric constant of from about 1 to about 50 in the solvent.

Aspect 7. The NIR II dye of any one of aspects 4-6, wherein the NIR II dye has a dipole moment of from about 0.3 to about 4 Debye in the solvent.

Aspect 8. The NIR II dye of any one of aspects 1-7, wherein the NIR II dye has an absorption maximum at from about 890 nm to about 930 nm.

Aspect 9. The NIR II dye of any one of aspects 1-8, wherein the NIR II dye has a fluorescence emission maximum at from about 1010 nm to about 1095 nm.

Aspect 10. The NIR II dye of any one of the preceding aspects, wherein the NIR II dye has an absorption maximum at about 920 nm and an emission maximum at about 1092 nm.

Aspect 11. The NIR II dye of any one of the preceding aspects, wherein the NIR II dye has a molar absorption coefficient of 90,000 $M^{-1} \cdot cm^{-1}$ or greater.

Aspect 12. The NIR II dye of any one of the preceding aspects, wherein the NIR II dye has a fluorescence quantum yield of 0.03 or greater.

Aspect 13. The NIR II dye of any one of the preceding aspects, wherein the NIR II dye has a Stokes shift in the NIR II region of 150 nm or greater.

Aspect 14. A method for making a NIR II dye, the method comprising:
(a) admixing a compound of Formula II and a compound of Formula III in a solvent to form a reaction mixture, Formula II

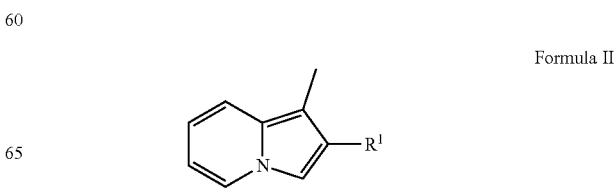

-continued

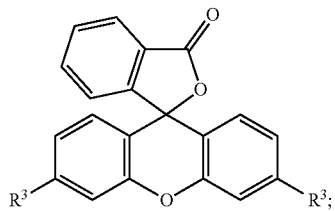

Formula III wherein R¹ comprises a substituted or unsubstituted C1-C10 linear or branched alkyl group, a substituted or unsubstituted C1-C10 linear or branched alkoxy group, a C3-C10 cycloalkyl group, a substituted or unsubstituted aryl or heteroaryl group, or any combination thereof;

wherein R³ comprises a halogen, triflate, tosylate, mesylate, nitrate, phosphate, an alkoxy group, or any combination thereof;

(b) heating the reaction mixture to form a compound of Formula IV

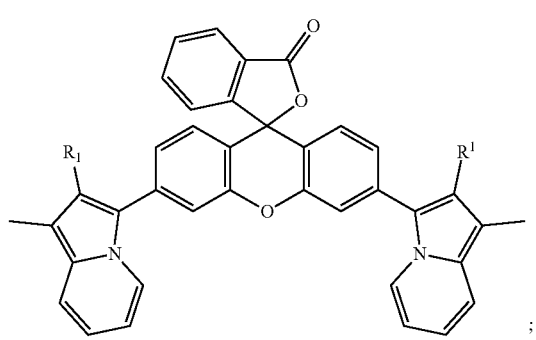

Formula IV (c) admixing the compound of Formula IV with a source of a leaving group to form an acid leaving group derivative; and (d) reacting the acid leaving group derivative with an alcohol to form the NIR II dye.

Aspect 15. The method of aspect 14, wherein R¹ is selected from phenyl, 4-cyano phenyl, 4-trifluoromethylphenyl, 4-nitrophenyl, 3,5-bis-trifluoromethylphenyl, 4-hydroxyphenyl, 4-methoxyphenyl, -Ph-4-O(CH₂)₄SO₃H, or any combination thereof.

Aspect 16. The method of aspect 14 or 15, wherein the alcohol is selected from methyl alcohol, ethyl alcohol, isopropyl alcohol, t-butyl alcohol, or any combination thereof.

Aspect 17. The method of any one of aspects 14-16, wherein the solvent comprises N-methyl-2-pyrrolidone (NMP), N,N-dimethylacetamide (DMA), dimethylformamide (DMF), toluene, tetrahydrofuran (THF), dioxane, or any combination thereof.

Aspect 18. The method of aspect 17, wherein the solvent is NMP, DMF, or a combination thereof.

Aspect 19. The method of any one of aspects 14-18, wherein, in step (b), the reaction mixture is heated at a temperature of from about 80° C. to about 150° C.

Aspect 20. The method of any one of aspects 14-19, wherein, in step (b), the reaction mixture is heated for from about 6 hours to about 24 hours.

Aspect 21. The method of any one of aspects 14-20, wherein step (b) is conducted in a nitrogen atmosphere.

Aspect 22. The method of any one of aspects 14-21, wherein step (a) further comprises admixing a catalyst with the compound of Formula II and the compound of Formula III.

Aspect 23. The method of aspect 22, wherein the catalyst comprises $PdCl_2(PPh_3)_2$, $Pd(OAc)_2$, $Pd(dba)_3 \cdot CHCl_3$, or any combination thereof.

Aspect 24. The method of aspect 22 or 23, wherein from about 0.05 to about 0.1 moles of catalyst are used per mole of compound of Formula II.

Aspect 25. The method of any one of aspects 14-24, wherein step (a) further comprises admixing a base with the compound of Formula II and the compound of Formula III.

Aspect 26. The method of aspect 25, wherein the base comprises KOAc, NOAc, $Cs_2CO_3$, KO$^t$Bu, NaO$^t$Bu, $K_2CO_3$, $Na_2CO_3$, or any combination thereof.

Aspect 27. The method of aspect 25 or 26, wherein from about 3.0 to about 6.0 moles of base are used per mole of compound of Formula II.

Aspect 28. The method of any one of aspects 14-27, wherein step (a) further comprises admixing a ligand with the compound of Formula II and the compound of Formula III.

Aspect 29. The method of aspect 28, wherein the ligand comprises $PPh_3$, XPhos, BINAP, ($^t$Bu)$_2$PMeHBF$_4$, or any combination thereof.

Aspect 30. The method of aspect 28 or 29, wherein from about 0.075 to about 0.2 moles of ligand are used per mole of compound of Formula II.

Aspect 31. The method of any one of aspects 14-30, wherein step (a) further comprises admixing an additive with the compound of Formula II and the compound of Formula III.

Aspect 32. The method of aspect 31, wherein the additive comprises pivalic acid (PivOH).

Aspect 33. The method of aspect 31 or 32, wherein about 0.3 moles of additive are used per mole of compound of Formula II.

Aspect 34. The method of any one of aspects 14-33, wherein the source of leaving group comprises a halogenating agent.

Aspect 35. The method of aspect 34, wherein the halogenating agent comprises a phosphorus halide, a dialkyl chloroiminium salt, a diaryl chloroiminium salt, an oxalyl halide, a carbonyl dihalide, or any combination thereof.

Aspect 36. The method of aspect 35, wherein the phosphorus halide has the formula $PW_3$, $POW_3$, or $PW_5$, wherein W is Cl, Br, or I.

Aspect 37. A NIR II dye produced by the method of any one of aspects 14-36.

Aspect 38. A composition comprising the NIR II dye of any one of aspects 1-13 or 37 or a salt thereof and a carrier.

Aspect 39. The composition of aspect 38, wherein the carrier comprises a pharmaceutically acceptable carrier.

Aspect 40. The composition of aspect 38 or 39, wherein the composition is nontoxic.

Aspect 41. A method for imaging a biological sample, the method comprising:
(a) contacting the biological sample with the composition of any one of aspects 38-40;
(b) exposing the biological sample and the composition to NIR II radiation; and
(c) observing NIR II fluorescence emission in the biological sample.

Aspect 42. The method of aspect 41, wherein the biological sample comprises an organelle, a cell, a tissue, an organ, or any combination thereof.

Aspect 43. A device comprising the NIR II dye of any one of aspects 1-13 or 37.

Aspect 44. The device of aspect 43, wherein the device comprises a night vision sensor, a solar cell, an organic light emitting diode (OLED) display, organic field effect transistor (OFET), or any combination thereof.

REFERENCES

1. Antaris, A. L.; et al, A high quantum yield molecule-protein complex fluorophore for near-infrared II imaging. Nat. Commun. 2017, 8, 15269.
2. Antaris, A. L.; et al, A small-molecule dye for NIR-II imaging. Nat. Mater. 2016, 15, 235-242.
3. Autry, S.; et al. Indolizine-Cyanine Dyes: Near Infrared Emissive Cyanine Dyes with Increased Stokes Shifts, J. Org. Chem, 2019, 84, 687-697.
4. Barlow, S.; et al, Polymethine materials with solid-state third-order optical susceptibilities suitable for all-optical signal-processing applications. Mater. Horiz. 2014, 1, 577-581.
5. Berezin, M. Y.; et al, Fluorescence Lifetime Measurements and Biological Imaging. Chem. Rev. 2010, 110, 2641-2684.
6. Best, Q. A.; et al, Anilinomethylrhodamines: pH Sensitive Probes with Tunable Photophysical Properties by Substituent Effect. J. Org. Chem. 2013, 78, 10134-10143.
7. Best, Q. A.; et al, pH-Dependent Si-Fluorescein Hypochlorous Acid Fluorescent Probe: Spirocycle Ring-Opening and Excess Hypochlorous Acid-Induced Chlorination. J. Am. Chem. Soc. 2013, 135, 13365-13370.
8. Braun, A. B.; et al, New Polyfluorinated Cyanine Dyes for Selective NIR Staining of Mitochondria. Chem. Eur. J. 2019, 25, 7998-8002.
9. Brogdon, P.; et al, A Computational and Experimental Study of Thieno[3,4-b]thiophene as a Proaromatic 7-Bridge in Dye-Sensitized Solar Cells. Chem. Eur. J. 2016, 22, 694-703.
10. Butkevich, A. N.; et al, Fluorescent Rhodamines and Fluorogenic Carbopyronines for Super-Resolution STED Microscopy in Living Cells. Angew. Chem. Int. Ed. 2016, 55, 3290-3294.
11. Cheema, H.; et al, Near-Infrared-Absorbing Indolizine-Porphyrin Push-Pull Dye for Dye-Sensitized Solar Cells. ACS Appl. Mater. Interfaces 2019, 11, 16474-16489.
12. Chen, X.; et al, Palladium(II)-Catalyzed C—H Activation/C—C Cross-Coupling Reactions: Versatility and Practicality. Angew. Chem. Int. Ed. 2009, 48, 5094-5115.
13. Cosco, E. D.; et al, Flavylium Polymethine Fluorophores for Near- and Shortwave Infrared Imaging. Angew. Chem. Int. Ed. 2017, 56, 13126-13129.
14. Daugulis, O.; et al, Palladium- and Copper-Catalyzed Arylation of Carbon-Hydrogen Bonds. Acc. Chem. Res. 2009, 42, 1074-1086.
15. Davies, H. M. L.; et al, Collective Approach to Advancing C—H Functionalization. ACS Cent. Sci. 2017, 3, 936-943.
16. Davies, K. S.; et al, Extended rhodamine photosensitizers for photodynamic therapy of cancer cells. Bioorg. Med. Chem. 2016, 24, 3908-3917.
17. Davydenko, I.; et al, Facile Incorporation of Pd(PPh3)2Hal Substituents into Polymethines, Merocyanines, and Perylene Diimides as a Means of Suppressing Intermolecular Interactions. J. Am. Chem. Soc. 2016, 138, 10112-10115.
18. Detty, M. R.; et al, Current clinical and preclinical photosensitizers for use in photodynamic therapy. J. Med. Chem. 2004, 47, 3897-3915.
19. Dost, T. L.; et al, Synthesis and Optical Properties of Pentamethine Cyanine Dyes with Carboxylic Acid Moieties. Anal. Chem. Insights 2017, 12, 1-6.
20. Fabian, J., Near-Infrared Absorbing Dyes. Chem. Rev. 1992, 92, 1197-1226.
21. Fu, M.; et al, A design concept of long-wavelength fluorescent analogs of rhodamine dyes: replacement of oxygen with silicon atom. Chem. Commun. 2008, 1780-1782.
22. Fukazawa, A.; et al, Phospha-fluorescein: a red-emissive fluorescein analogue with high photobleaching resistance. Chem. Commun. 2016, 52, 1120-1123.
23. Gayton, J. N.; et al, Counter Anion Effect on the Photophysical Properties of Emissive Indolizine-Cyanine Dyes in Solution and Solid State. Molecules 2018, 23, 3051.
24. Gayton, J.; et al, Indolizine-Cyanine Dyes: Near Infrared Emissive Cyanine Dyes with Increased Stokes Shifts. J. Org. Chem. 2019, 84, 687-697.
25. Grimm, J. B.; et al. Synthesis of Rhodamines from Fluoresceins Using Pd-Catalyzed C—N Cross-Coupling. Org. Lett. 2011, 13, 6354-6357.
26. Guo, Z.; et al, Recent progress in the development of near-infrared fluorescent probes for bioimaging applications. Chem. Soc. Rev. 2014, 43, 16-29.
27. Hong, G.; et al, Near-infrared fluorophores for biomedical imaging. Nat. Biomed. Eng. 2017, 1, 0010.
28. Huckaba, A. J.; et al, A Low Recombination Rate Indolizine Sensitizer for Dye-Sensitized Solar Cells. Chem. Commun. 2016, 52, 8424-8427.
29. Huckaba, A. J.; et al, Indolizine-Based Donors as Organic Sensitizer Components for Dye-Sensitized Solar Cells. Adv. Energy Mater. 2015, 5, 1401629.
30. Huckaba, A. J.; et al, Molecular Design Principles for Near-Infrared Absorbing and Emitting Indolizine Dyes. Chem. Eur. J. 2016, 22, 15536-15542.
31. Jin, T., Review—Recent Progress in NIR Fluorophores Emitting over 1000 nm for Bioimaging. ECS J. Solid State Sci. and Technol. 2019, 8, R9-R13.
32. Kinnibrugh, T. L.; et al, Dipolar Second-Order Nonlinear Optical Chromophores Containing Ferrocene, Octamethylferrocene, and Ruthenocene Donors and Strong pi-Acceptors: Crystal Structures and Comparison of pi-Donor Strengths. Organometallics 2009, 28, 1350-1357.
33. Koszarna, B.; et al, Direct arylation of electron-poor indolizines. Tetrahedron 2014, 70, 225-231.
34. Kuimova, M. K.; et al, Photophysical properties and intracellular imaging of water-soluble porphyrin dimers for two-photon excited photodynamic therapy. Org. Biomol. Chem. 2009, 7, 889-896.
35. Kushida, Y.; et al, Silicon-substituted xanthene dyes and their applications in bioimaging. Analyst 2015, 140, 685-695.
36. Lambert, C.; et al, Coupled oscillators for tuning fluorescence properties of squaraine dyes. J. Am. Chem. Soc. 2015, 137, 3547-3557.
37. Liégault, B.; et al, Establishment of Broadly Applicable Reaction Conditions for the Palladium-Catalyzed Direct Arylation of Heteroatom-Containing Aromatic Compounds. J. Org. Chem. 2009, 74, 1826-1834.

38. Lu, Y.; et al, New frog-type Dibenzo[a,c][1,2,5]thiadiazolo[3,4-i]phenazine heterocyclic derivatives with aggregation-enhanced one- and two-photon excitation NIR fluorescence. Dyes and Pigments 2018, 153, 233-240.
39. Ma, Z.; et al, A theranostic agent for cancer therapy and imaging in the second near-infrared window. Nano Res. 2019, 12, 273-279.
40. McNamara, L. E.; et al, Indolizine-Squaraines: NIR Fluorescent Materials with Molecularly Engineered Stokes Shifts. Chem. Eur. J. 2017, 23, 12494-12501.
41. Myochin, T.; et al, Development of a series of near-infrared dark quenchers based on Si-rhodamines and their application to fluorescent probes. J. Am. Chem. Soc. 2015, 137, 4759-4765.
42. Nandakumar, A.; et al, Tetrasubstituted Olefinic Xanthene Dyes: Synthesis via Pd-Catalyzed 6-exo-dig Cyclization/C—H Activation of 2-Bromobenzyl-N-propargylamines and Solid State Fluorescence Properties. Org. Lett. 2013, 15, 382-385.
43. Nesterova, I. V.; et al, Metallo-Phthalocyanine Near-IR Fluorophores: Oligonucleotide Conjugates and Their Applications in PCR Assays. Bioconjugate Chem. 2007, 18, 2159-2168.
44. Patalag, J. L.; et al, Exploring the 1T System of the (Aza-) BOIMPY Scaffold: Electron-Rich Pyrrole Moieties Working in Concert with Electron-Depleted Meso-Positions. J. Org. Chem. 2019, 84, 7804-7814.
45. Patwari, J.; et al, Three-in-one approach towards efficient organic dye-sensitized solar cells: aggregation suppression, panchromatic absorption and resonance energy transfer. Beilstein J Nanotechnol 2017, 8, 1705-1713.
46. Qian, G.; et al, Band Gap Tunable, Donor-Acceptor-Donor Charge-Transfer Heteroquinoid-Based Chromophores: Near Infrared Photoluminescence and Electroluminescence. Chem. Mater. 2008, 20, 6208-6215.
47. Qian, G.; et al, Near-infrared organic compounds and emerging applications. Chem. Asian J. 2010, 5, 1006-1029.
48. Roger, J.; et al, Aryl triflates: useful coupling partners for the direct arylation of heteroaryl derivatives via Pd-catalyzed C—H activation—functionalization. Org. Biomol. Chem. 2008, 6, 169-174.
49. Sakamoto, N.; et al, alpha-Bridged BODIPY oligomers with switchable near-IR photoproperties by external-stimuli-induced foldamer formation and disruption. Chem. Commun. 2012, 48, 4818-4820.
50. Shindy, H. A., Fundamentals in the chemistry of cyanine dyes: A review. Dyes and Pigments 2017, 145, 505-513.
51. Smith, A. M.; et al, Bioimaging: second window for in vivo imaging. Nat. Nanotech. 2009, 4, 710-711.
52. Staudinger, C.; et al, Near-infrared fluorescent aza-BODIPY dyes for sensing and imaging of pH from the neutral to highly alkaline range. Analyst 2019, 144, 2393-2402.
53. Sun, Y. Q.; et al, Rhodamine-inspired far-red to near-infrared dyes and their application as fluorescence probes. Angew. Chem. Int. Ed. 2012, 51, 7634-7636.
54. Sun, Y.; et al, Novel benzo-bis(1,2,5-thiadiazole) fluorophores for in vivo NIR-II imaging of cancer. Chem. Sci. 2016, 7, 6203-6207.
55. Suzuki, H., Organic Light-Emitting Materials and Devices for Optical Communicaiton Technology. J. Photochem. Photobio. A 2004, 166, 155-161.
56. Tuong Ly, K.; et al, Near-infrared organic light-emitting diodes with very high external quantum efficiency and radiance. Nat. Photon. 2016, 11, 63-68.
57. Umezawa, K.; et al, Water-soluble NIR Fluorescent Probes Based on Squaraine and Their Application for Protein Labeling. Anal. Sci. 2008, 24, 213-217.
58. Verbelen, B.; et al, Direct palladium-catalysed C—H arylation of BODIPY dyes at the 3- and 3,5-positions. Chem. Commun. 2012, 48, 9129-9131.
59. Verbelen, B.; et al, Radical C—H Alkylation of BODIPY Dyes Using Potassium Trifluoroborates or Boronic Acids. Chem. Eur. J. 2015, 21, 12667-12675.
60. Verbelen, B.; et al, Radical C—H Arylation of the BODIPY Core with Aryldiazonium Salts: Synthesis of Highly Fluorescent Red-Shifted Dyes. Angew. Chem. Int. Ed. 2015, 54, 4612-4616.
61. Wakioka, M.; et al. A Highly Efficient Catalytic System for Polycondensation of 2,7-Dibromo-9,9-dioctylfluorene and 1,2,4,5-Tetrafluorobenzene via Direct Arylation. Macromolecules 2013, 46, 370-374.
62. Wang, L. G.; et al, Altering Fundamental Trends in the Emission of Xanthene Dyes. J. Org. Chem. 2019, 84, 2585-2595.
63. Wang, W.; et al, Molecular Cancer Imaging in the Second Near-Infrared Window Using a Renal-Excreted NIR-II Fluorophore-Peptide Probe. Adv. Mater. 2018, e1800106.
64. Williams, A. T. R.; et al, Relative fluorescence quantum yields using a computer-controlled luminescence spectrometer. Analyst 1983, 108, 1067-1071.
65. Woodroofe, C. C.; et al. Synthesis of isomerically pure carboxylate- and sulfonate-substituted xanthene fluorophores. Tetrahedron 2005, 61, 3097-3105
66. Xue, J.; et al, High-efficiency and low efficiency roll-off near-infrared fluorescent OLEDs through triplet fusion. Chem. Sci. 2016, 7, 2888-2895.
67. Yamazawa, S. et al, 2,3-Naphtho-Fused BODIPYs as Near-Infrared Absorbing Dyes. J. Org. Chem. 2016, 81, 1310-1315.
68. Yang, Q.; et al, Rational Design of Molecular Fluorophores for Biological Imaging in the NIR-II Window. Adv. Mater. 2017, 29, 1605497.
69. Yang, Z.; et al, Super-resolution fluorescent materials: an insight into design and bioimaging applications. Chem. Soc. Rev. 2016, 45, 4651-4667.
70. Yao, J. H.; et al, Bisanthracene Bis(dicarboxylic imide)s as Soluble and Stable NIR Dyes. Chem. Eur. J. 2009, 15, 9299-9302.
71. Yao, L.; et al, Highly Efficient Near-Infrared Organic Light-Emitting Diode Based on a Butterfly-Shaped Donor—Acceptor Chromophore with Strong Solid-State Fluorescence and a Large Proportion of Radiative Excitons. Angew. Chem. Int. Ed. 2014, 53, 2119-2123.
72. Yuan, L.; et al, A Unique Approach to Development of Near-Infrared Fluorescent Sensors for in Vivo Imaging. J. Am. Chem. Soc. 2012, 134, 13510-13523.
73. Yuan, L.; et al, A Unique Class of Near-Infrared Functional Fluorescent Dyes with Carboxylic-Acid-Modulated Fluorescence ON/OFF Switching: Rational Design, Synthesis, Optical Properties, Theoretical Calculations, and Applications for Fluorescence Imaging in Living Animals. J. Am. Chem. Soc. 2012, 134, 1200-1211.
74. Zebibula, A.; et al, Ultrastable and Biocompatible NIR-II Quantum Dots for Functional Bioimaging. Adv. Funct. Mater. 2018, 28, 1703451.
75. Zhang, X. D.; et al, Traumatic Brain Injury Imaging in the Second Near-Infrared Window with a Molecular Fluorophore. Adv. Mater. 2016, 28, 6872-6879.

76. Zhang, Y.; et al, Biodistribution, pharmacokinetics and toxicology of $Ag_2S$ near-infrared quantum dots in mice. Biomaterials 2013, 34, 3639-3646.

77. Zhang, Y.; et al, Near-Infrared Fluorescent Thienothiadiazole Dyes with Large Stokes Shifts and High Photostability. J. Org. Chem. 2017, 82, 5597-5606.

78. Zhao, J.; et al, NIR-I-to-NIR-II fluorescent nanomaterials for biomedical imaging and cancer therapy. J. Mater. Chem. B. 2018, 6, 349-365.

What is claimed is:

1. A near infrared II (NIR II) dye comprising a structure of Formula I,

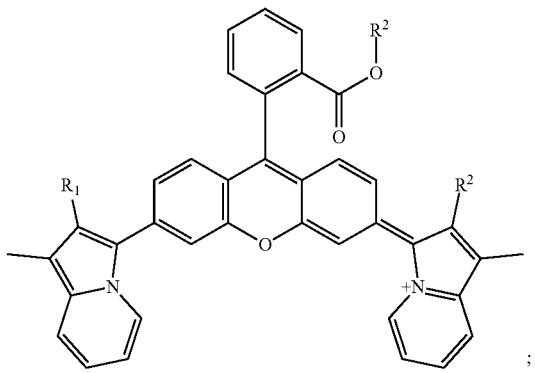

wherein $R^1$ comprises a substituted or unsubstituted C1-C10 linear or branched alkyl group, a substituted or unsubstituted C1-C10 linear or branched alkoxy group, a C3-C10 cycloalkyl group, a substituted or unsubstituted aryl or heteroaryl group, or any combination thereof; and wherein $R^2$ comprises a C1-C10 linear or branched alkyl group, a C3-C10 cycloalkyl group, or any combination thereof.

2. The NIR II dye of claim 1, wherein $R^1$ is selected from phenyl, 4-cyano phenyl, 4-trifluoromethylphenyl, 4-nitrophenyl, 3,5-bis-trifluoromethylphenyl, 4-hydroxyphenyl, 4-methoxyphenyl, -Ph-4-O(CH$_2$)$_4$SO$_3$H, or any combination thereof.

3. The NIR II dye of claim 1, wherein the NIR II dye is selected from

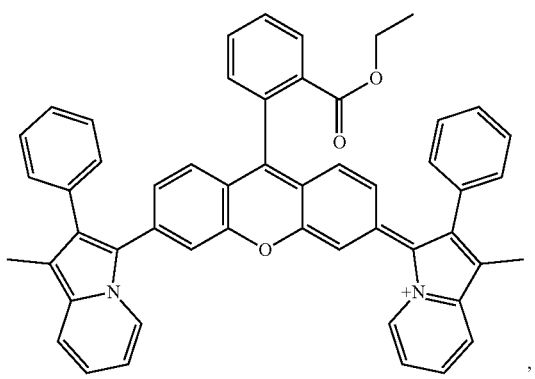

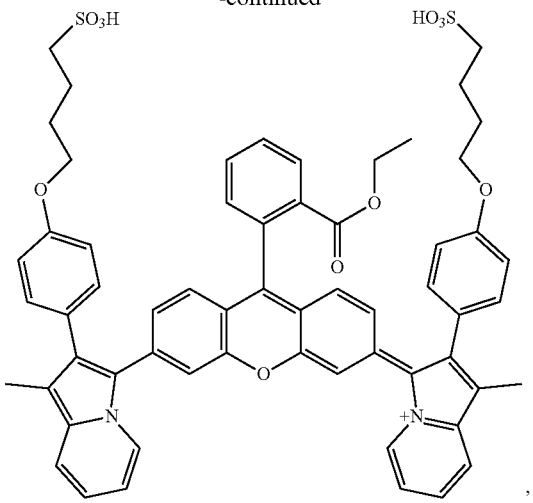

or any combination thereof.

4. The NIR II dye of claim 1, wherein the NIR II dye is soluble in at least one solvent, wherein the solvent comprises water, acetone, chloroform, dichloromethane, dimethylformamide, DMSO, ethyl acetate, ethanol, methanol, tetrahydrofuran, toluene, or any combination thereof.

5. The NIR II dye of claim 1, wherein the NIR II dye comprises an absorption maximum at from about 890 nm to about 930 nm and an emission maximum at from about 1010 nm to about 1095 nm.

6. The NIR II dye of claim 1, wherein the NIR II dye comprises a Stokes shift of at least 150 nm.

7. A method for making a NIR II dye, the method comprising:

(a) admixing a compound of Formula II and a compound of Formula III in a solvent to form a reaction mixture,

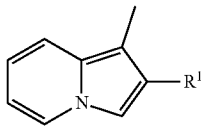

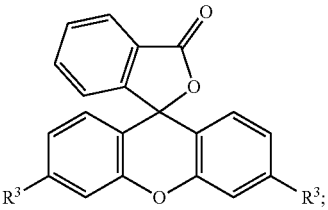

wherein $R^1$ comprises a substituted or unsubstituted C1-C10 linear or branched alkyl group, a substituted or unsubstituted C1-C10 linear or branched alkoxy group, a C3-C10 cycloalkyl group, a substituted or unsubstituted aryl or heteroaryl group, or any combination thereof;

wherein $R^3$ comprises a halogen, triflate, tosylate, mesylate, nitrate, phosphate, an alkoxy group, or any combination thereof;

(b) heating the reaction mixture to form a compound of Formula IV

Formula IV

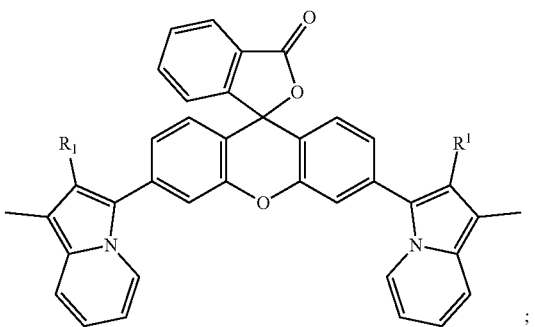

(c) admixing the compound of Formula IV with a source of a leaving group to form an acid leaving group derivative; and (d) reacting the acid leaving group derivative with an alcohol to form the NIR II dye.

8. The method of claim 7, wherein $R^1$ is selected from phenyl, 4-cyano phenyl, 4-trifluoromethylphenyl, 4-nitrophenyl, 3,5-bis-trifluoromethylphenyl, 4-hydroxyphenyl, 4-methoxyphenyl, -Ph-4-O(CH$_2$)$_4$SO$_3$H, or any combination thereof.

9. The method of claim 7, wherein the alcohol is selected from methyl alcohol, ethyl alcohol, isopropyl alcohol, t-butyl alcohol, or any combination thereof.

10. The method of claim 7, wherein the solvent comprises N-methyl-2-pyrrolidone (NMP), N,N-dimethylacetamide (DMA), dimethylformamide (DMF), toluene, tetrahydrofuran (THF), dioxane, or any combination thereof.

11. The method of claim 7, wherein step (a) further comprises admixing a catalyst with the compound of Formula II and the compound of Formula III, wherein the catalyst comprises PdCl$_2$(PPh$_3$)$_2$, Pd(OAc)$_2$, Pd(dba)$_3$·CHCl$_3$, or any combination thereof.

12. The method of claim 7, wherein step (a) further comprises admixing a base with the compound of Formula II and the compound of Formula III, wherein the base comprises KOAc, NOAc, Cs$_2$CO$_3$, KO$^t$Bu, NaO$^t$Bu, K$_2$CO$_3$, Na$_2$CO$_3$, or any combination thereof.

13. The method of claim 7, wherein step (a) further comprises admixing a ligand with the compound of Formula II and the compound of Formula III, wherein the ligand comprises PPh$_3$, XPhos, BINAP, ($^t$Bu)$_2$PMeHBF$_4$, or any combination thereof.

14. The method of claim 7, wherein the source of leaving group comprises a phosphorus halide, a dialkyl chloroiminium salt, a diaryl chloroiminium salt, an oxalyl halide, a carbonyl dihalide, or any combination thereof.

15. A composition comprising the NIR II dye of claim 1 or a salt thereof and a pharmaceutically-acceptable carrier.

16. The composition of claim 15, wherein the composition is nontoxic.

17. A method for imaging a biological sample, the method comprising:
(a) contacting the biological sample with the composition of claim 15;
(b) exposing the biological sample and the composition to NIR II radiation; and
(c) observing NIR II fluorescence emission in the biological sample.

18. The method of claim 17, wherein the biological sample comprises an organelle, a cell, a tissue, an organ, or any combination thereof.

19. A device comprising the NIR II dye of claim 1.

20. The device of claim 19, wherein the device comprises a night vision sensor, a solar cell, an organic light emitting diode (OLED) display, organic field effect transistor (OFET), or any combination thereof.

* * * * *